Sept. 26, 1933.  C. A. CAMPBELL  1,928,091
AIR BRAKE
Filed Feb. 21, 1931   8 Sheets-Sheet 1
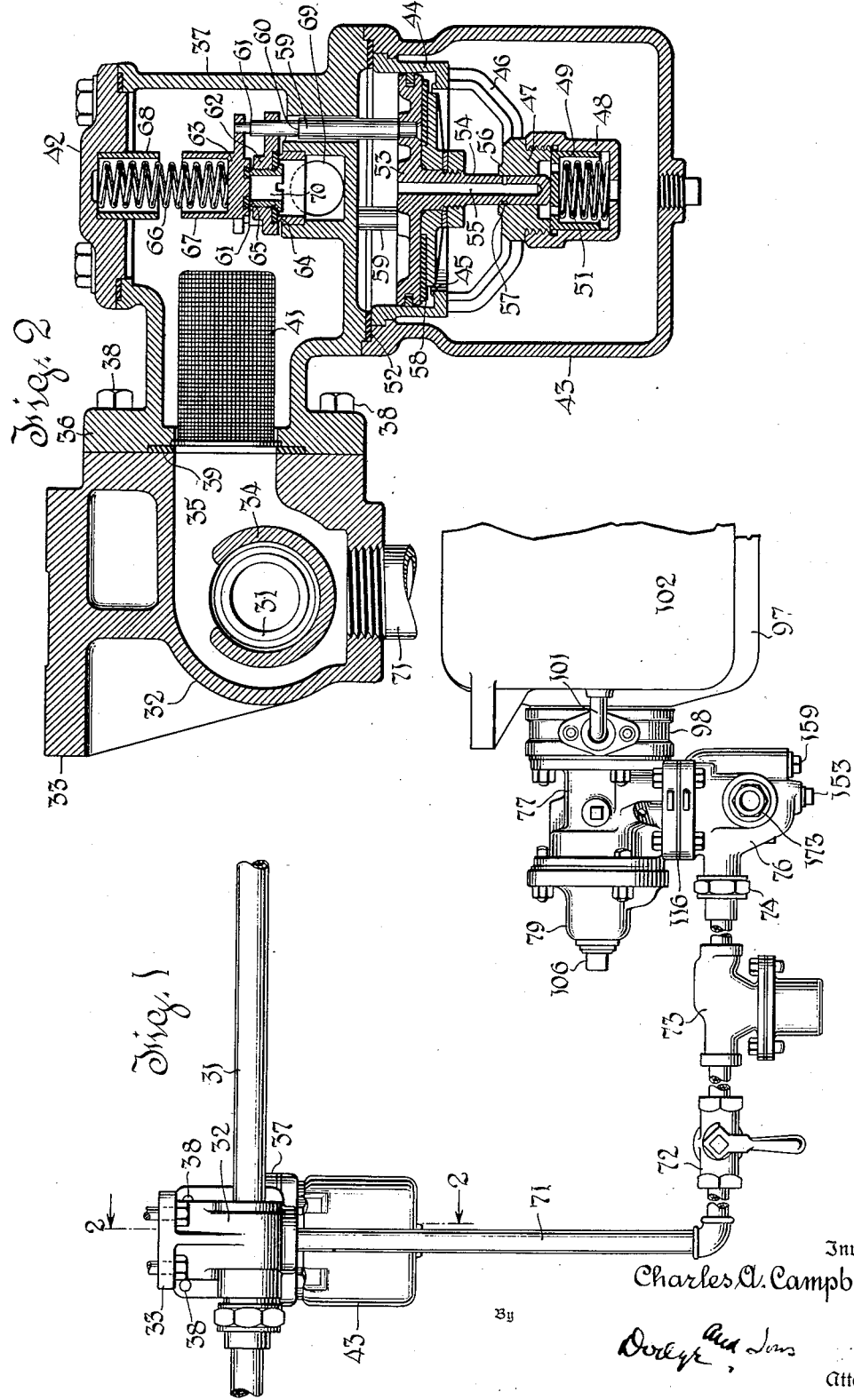
Inventor
Charles A. Campbell
By
Dodge and Sons
Attorneys

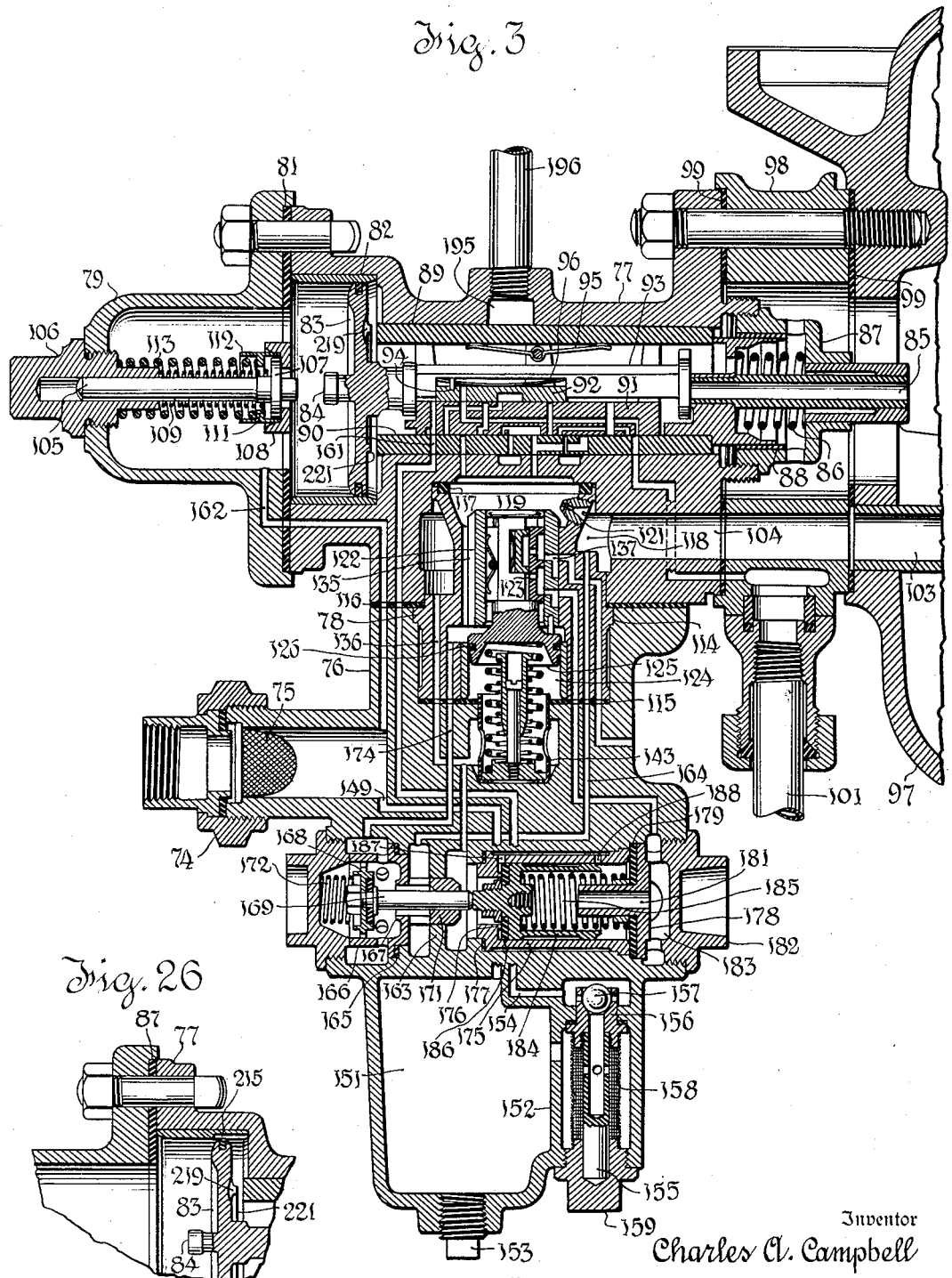

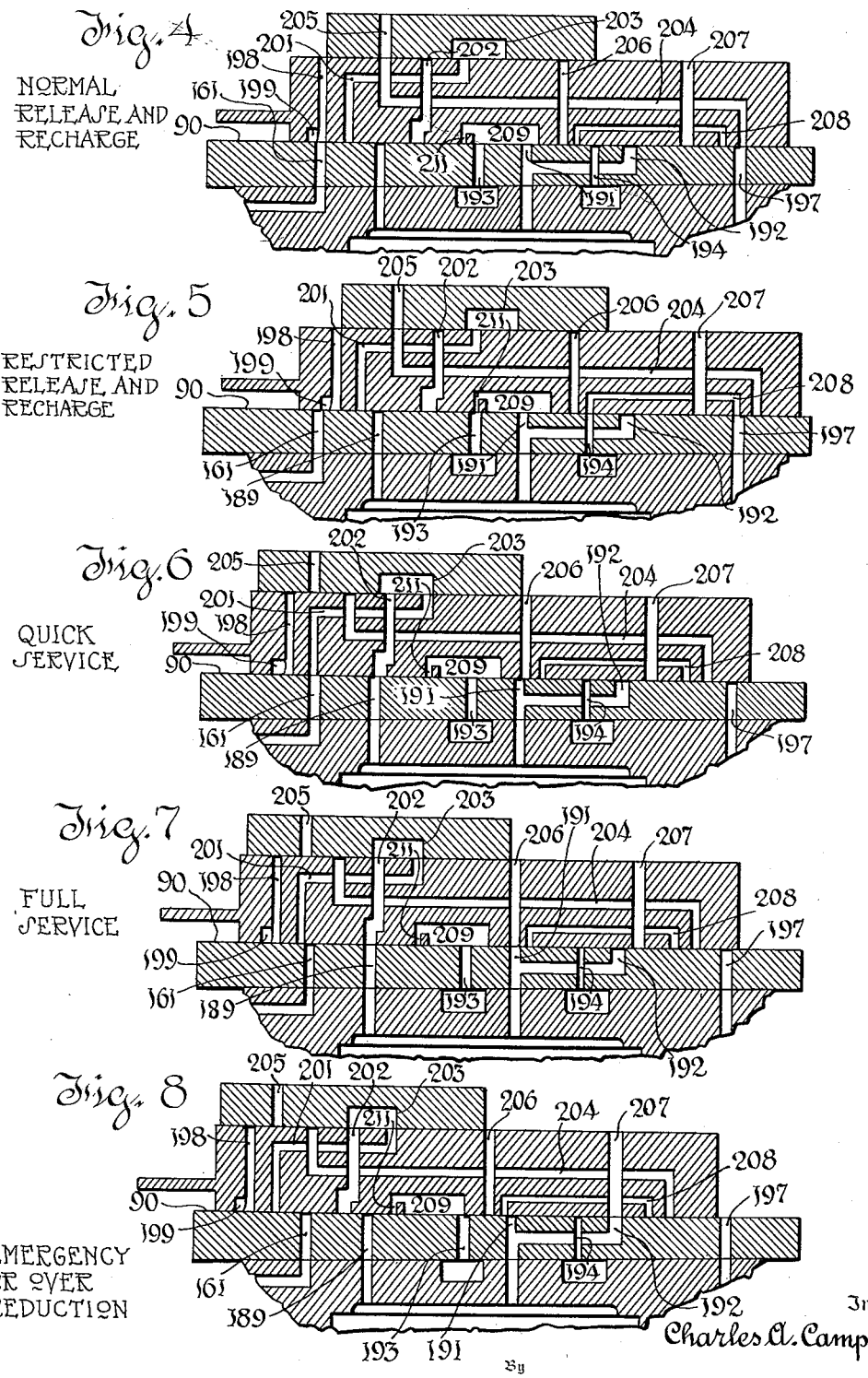

Sept. 26, 1933.  C. A. CAMPBELL  1,928,091
AIR BRAKE
Filed Feb. 21, 1931   8 Sheets-Sheet 4
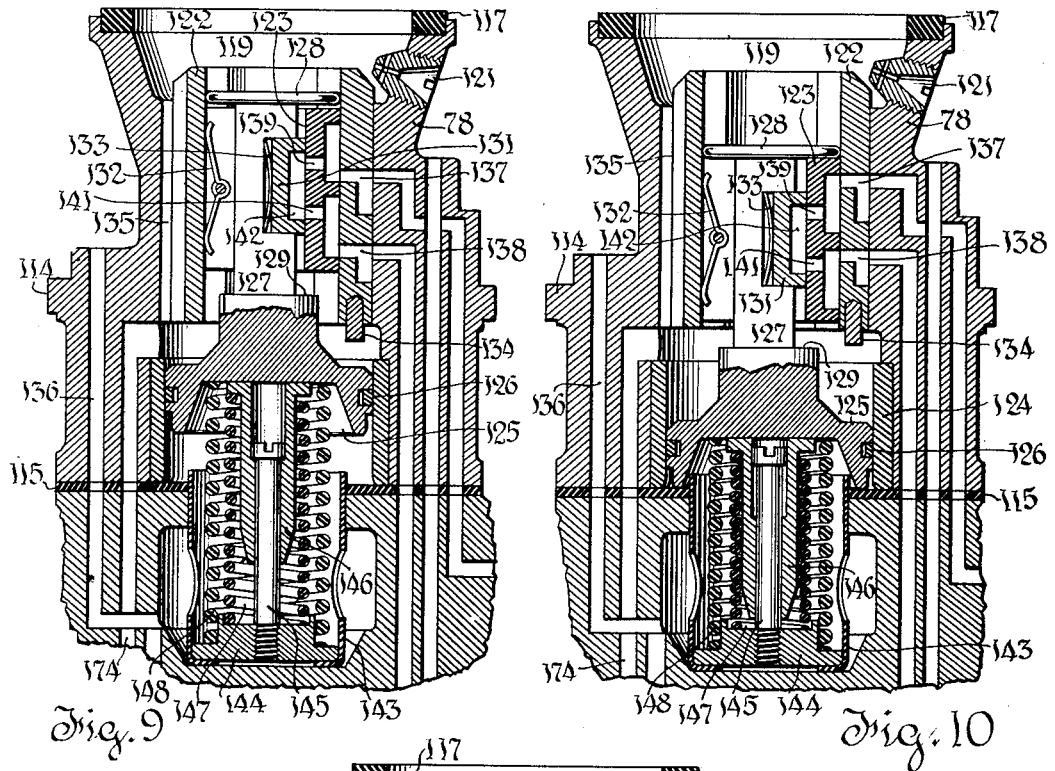
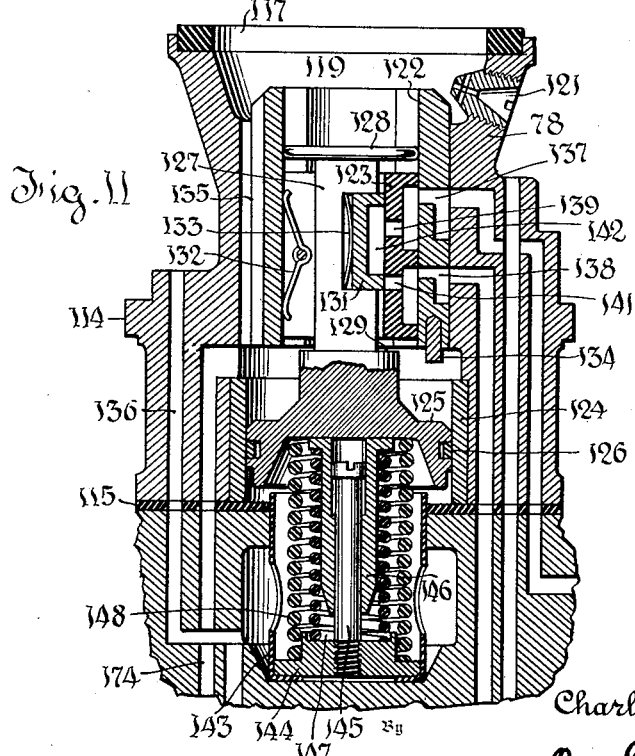
Inventor
Charles A. Campbell
Dodge and Sons
Attorneys

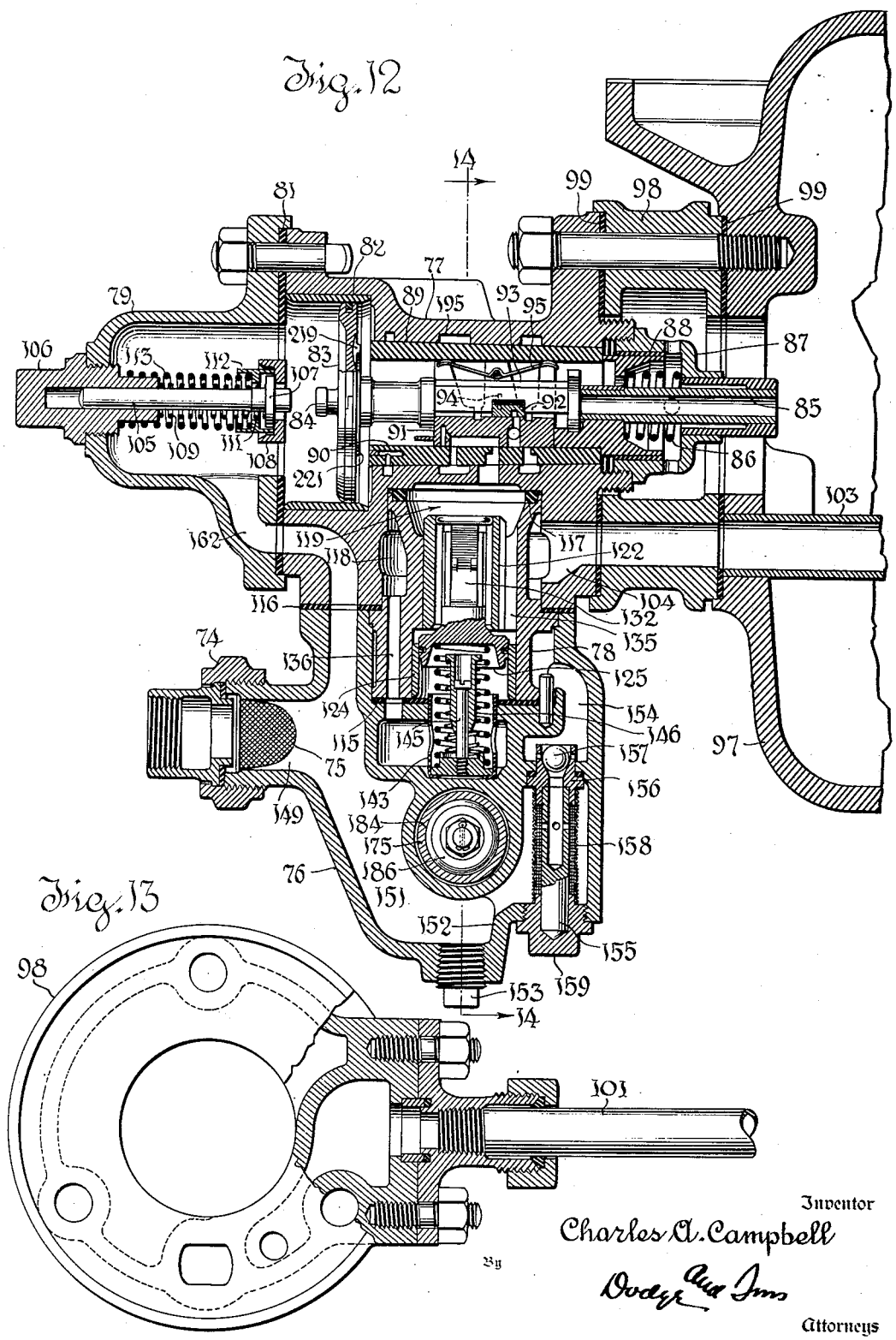

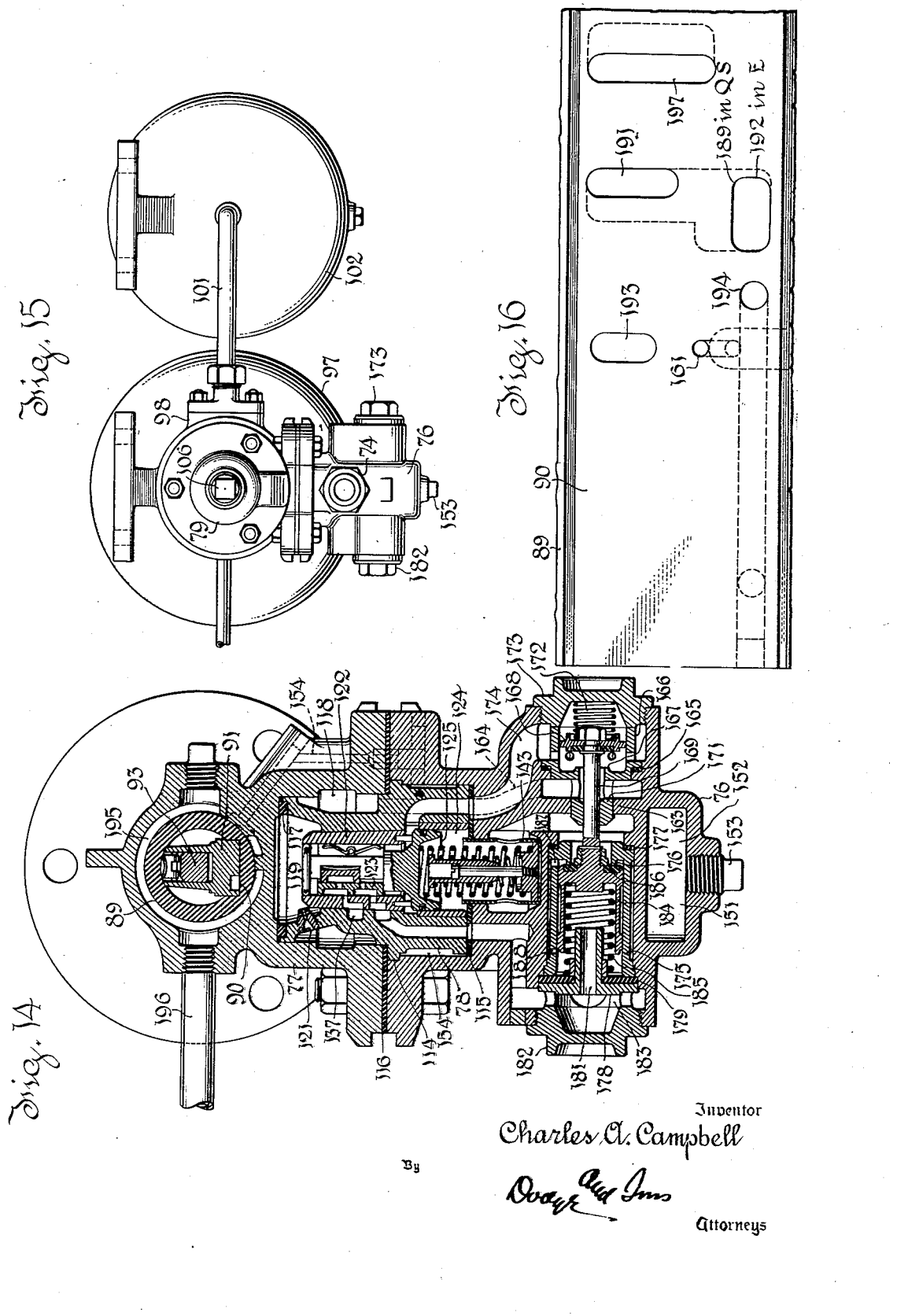

Sept. 26, 1933.  C. A. CAMPBELL  1,928,091
AIR BRAKE
Filed Feb. 21, 1931  8 Sheets-Sheet 7
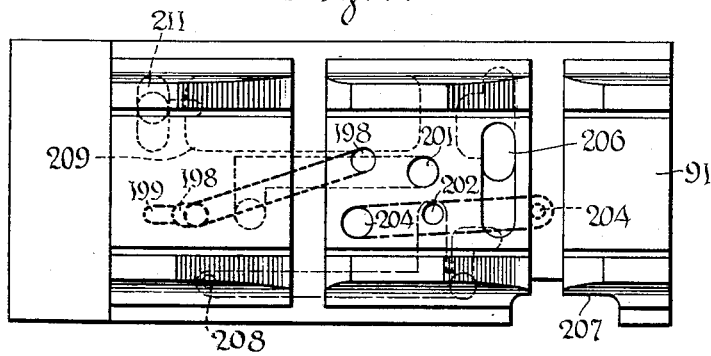
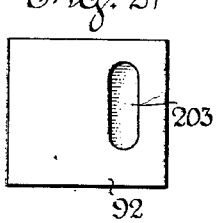
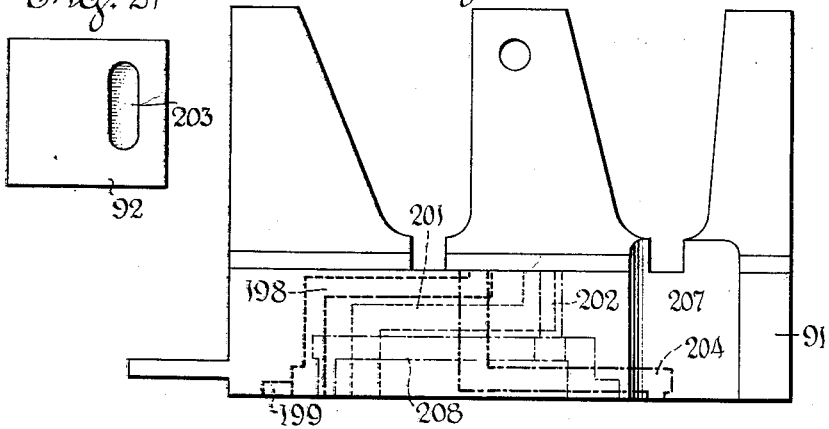
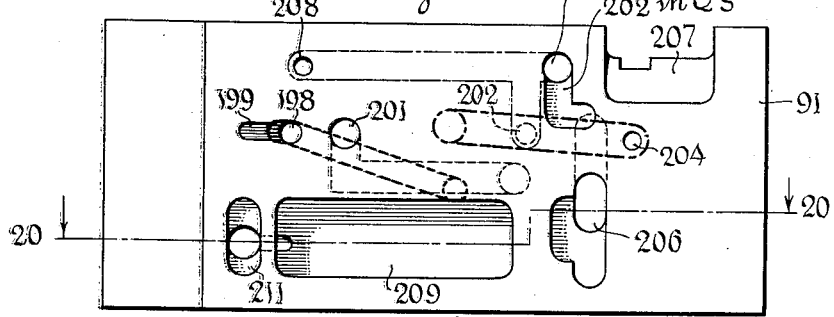
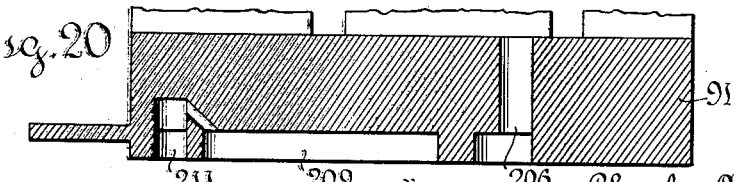
Inventor
Charles A. Campbell
Attorneys Sept. 26, 1933.  C. A. CAMPBELL  1,928,091
AIR BRAKE
Filed Feb. 21, 1931   8 Sheets-Sheet 8
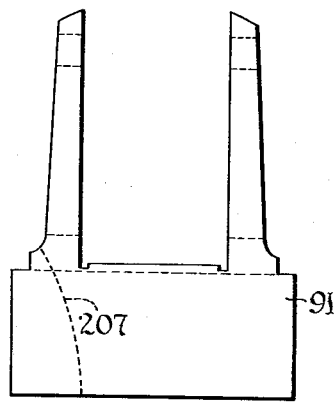
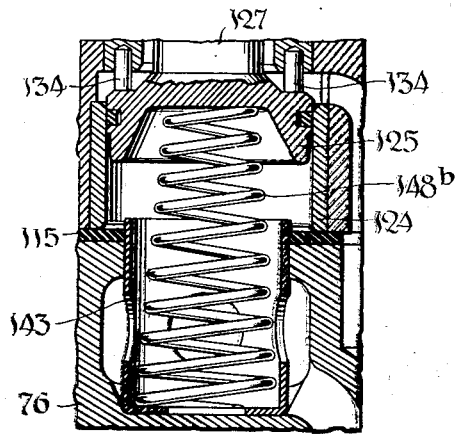
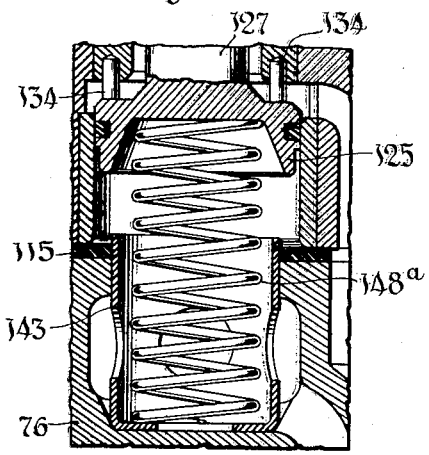
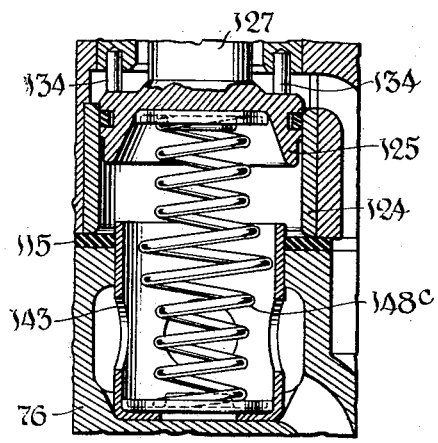
Inventor
Charles A. Campbell
BY
Dodge
Attorneys Patented Sept. 26, 1933

1,928,091

UNITED STATES PATENT OFFICE 1,928,091

AIR BRAKE

Charles A. Campbell, Watertown, N. Y., assignor to The New York Air Brake Company, a corporation of New Jersey Application February 21, 1931 Serial No. 517,604

42 Claims. (Cl. 303—46)

This invention relates to air brakes, and particularly to triple valves. The present application is a substitute for, and in part a continuation of, my application Serial No. 439,743, filed March 28, 1930.

In the following description reference will be made to the type K triple valve. This valve has so long been standard on North American railways and is so well known that a detailed description is unnecessary. For information as to the standardized construction of this valve, reference may be made to Instruction Pamphlet, No. 18, published January 1927, by The New York Air Brake Company.

The prime object of the present invention is to retain the advantageous operative characteristics of the well known type K triple valves (such as local quick service venting, retarded release, restricted recharge) and add to them a number of advantageous characteristics and functions.

These added characteristics and functions are, generally stated, reduction to the minimum of the risk of an undesired emergency application, ability to initiate an emergency function after any service reduction, delayed or three-stage rise of brake cylinder pressure in emergency applications, quicker and more uniform release throughout a train, dissipation of overcharge (if any) in auxiliary reservoirs after restricted recharge, and increased sensitiveness in response to slow brake pipe reductions.

Individually considered, some of the functions and characteristics above enumerated have been proposed before, but never, so far as applicant is advised, has there been evolved a simple and practicable mode of combining them in a single structure. Car interchange introduces the requirement that any new triple valve, to be considered for commercial adoption, must operate satisfactorily in trains of mixed equipment (old and new). The present valve not only meets that requirement, but the operation of the entire mixed equipment train is superior to the operation of a solid train of old equipment.

Another advantage of marked importance is the fact that existing standard equipment can be changed over to embody the present invention, so that complete and rapid conversion to the present valve as standard is economically possible.

Generally stated, change over from the present standards using the K type triple valve involves installation of a brake pipe vent valve, and an additional (supplemental) reservoir. In the triple valve structure new parts are substituted for old, as follows:—cylinder bushing, slide valve bushing, slide valve, retard spring; also the entire lower body with emergency valve assembly is discarded in favor of a new lower body containing the reservoir feed check valve, and the pistons and valves for controlling the emergency brake-cylinder pressure rise characteristics. The retard stop is modified. The front cap is slightly modified and a second graduating spring is added. The auxiliary reservoir, brake cylinder, centrifugal dirt collector, cut-out cock, bleed cock and retainer remain unchanged. Longer studs are substituted for the studs which attach the K triple to the auxiliary reservoir.

The desirability of using as many parts of existing triple valves as possible, affects in considerable degree the design of the embodiment chosen for illustration, but it will be understood that so far as the operative features of the valve are concerned, many changes in form and arrangement, may be found desirable.

In the drawings a type K valve installation changed over to embody the invention is illustrated. In certain of the figures the actual structure is shown, while in others a diagrammatic arrangement is shown. Such diagrammatic arrangement is functionally identical with the actual construction, but has the advantage, for descriptive purposes, that all the ports are brought into a single plane so that in a single view it is possible to trace all the flows which take place.

In the drawings,—

Fig. 1 is an elevation showing the equipment for one car. Portions only of the brake pipe, reservoirs, and brake cylinder pipe, are shown, and the brake cylinder is omitted altogether. These parts, however, conform to known practice, are not involved in the invention, and will vary in some degree according to the type of car.

Fig. 2 is a section on the line 2—2 of Fig. 1, and shows the construction of the emergency vent valve and the manner of connecting it to the brake pipe.

Fig. 3 is a diagrammatic view drawn as if taken in vertical section through the axis of the triple valve.

Fig. 4 is an enlarged diagrammatic view of the triple slide valve with its seat and graduating valve, the parts being shown in normal release and recharge position.

Fig. 5 is a similar view showing the parts in restricted release and recharge position.

Fig. 6 is a similar view showing the parts in quick service position.

Fig. 7 is a similar view showing the parts in full service position.

Fig. 8 is a similar view showing the parts in emergency position. This is the same position as is assumed in what is known as over-reduction position, that is, the position assumed when brake pipe pressure is reduced 12 pounds or more below the point of equalization with auxiliary reservoir pressure.

Fig. 9 is a diagrammatic view on an enlarged scale, showing the actuating piston and valve which control the delayed build-up of brake cylinder pressure, the parts being illustrated at the termination of their first or partial downward movement.

Fig. 10 is a similar view showing the position assumed by the parts after the piston has moved to its lowermost limit of motion.

Fig. 11 is a similar view of the parts, showing the position assumed after the piston has started to move up and has carried the graduating valve far enough to lap the lower port in the shifting seat.

Fig. 12 is a vertical axial section through the triple valve as actually constructed.

Fig. 13 is an elevation of the filler block or adapter for connecting the supplemental reservoir. In this view the adapter is shown as it would appear looking to the right relatively to Fig. 12.

Fig. 14 is a section on the line 14—14 of Fig. 12.

Fig. 15 is an elevation of the triple valve, as actually constructed, connected with the auxiliary and supplemental reservoirs.

Fig. 16 is a plan view of the seat for the triple slide valve, showing the actual location of the ports.

Fig. 17 is a plan view of the triple slide valve, showing the actual location of ports in the top face, and showing, in dotted lines, the connecting passages through the body of the valve.

Fig. 18 is a side elevation of the triple slide valve.

Fig. 19 is a view of the lower face of the triple slide valve, showing the actual location of the ports, and in dotted lines the connecting passages through the body of the valve.

Fig. 20 is a section on the line 20—20 of Fig. 19.

Fig. 21 is a view of the lower face of the graduating valve used with the triple slide valve, showing the actual location of the quick service cavity.

Fig. 22 is an end elevation of the triple slide valve.

Fig. 23 is a fragmentary view, similar to a portion of Fig. 14, and showing a modification in which a single specially formed spring is substituted for the double spring mechanism shown in Fig. 14.

Fig. 24 is a similar view showing the substitution of a single simple coil spring for the double spring shown in Fig. 14. This substitution produces the mechanism disclosed in my prior application Serial No. 439,743 above identified.

Fig. 25 is a similar view showing a further modification in which another special form of spring is used.

Fig. 26 is a fragmentary view, showing a modification in which a charging groove in the piston bushing is used.

The passages in the slide valve are formed by the familiar practice of drilling and plugging. No effort to illustrate this in Figs. 17 to 21 has been made, as it is a common practice, and would confuse the drawings.

The brake pipe and connections

Referring first to Figs. 1 and 2, a portion of the brake pipe appears at 31. As is usual in automatic air brakes, the brake pipe extends throughout the length of the train, is connected from car to car with the usual brake pipe hose and couplings, and is equipped with the usual angle cock at each end of each car. These details are not illustrated. Pressure in the brake pipe is controlled as usual by the engineer's brake valve, which may, so far as the present invention is concerned, be of any suitable type.

There is introduced in the brake pipe, near the middle of the car, a special branch pipe T or connection 32 which is provided with a bolting flange 33, intended to be connected to the framing of the car. The connection 32 is so contrived that the portions of the brake pipe 31 on opposite sides of the connection 32 are alined with each other. The path of flow between the two sections of the brake pipe is defined by a trough-like member 34, which is open at its top to the chamber 35 within the connection 32. The purpose of this arrangement is to offer a straight unobstructed flow path through the connection 32 and to minimize the discharge of moisture and scale from the brake pipe 31 into the chamber 35. This T connection is not claimed herein but forms a part of the subject matter of my application Serial No. 560,806, filed September 2, 1931.

Construction of emergency vent valves

The connection 32 is formed at one side with a bolting face or pad having an opening leading to the chamber 35 and adapted to receive the bolting flange 36 for the body 37 of the emergency vent valve. Connecting bolts are indicated at 38. The flange 36 is recessed to receive a gasket 39 and strainer 41 whose forms are clearly shown in the drawings.

The top of the body 37 is closed by a removable cap 42 held in place by machine screws and sealed by a gasket, as clearly indicated in the drawings. Suspended beneath the body 37 is a cup-like shell or chamber 43 which serves as the reservoir chamber of the vent valve. The shell 43 is bolted in place and is counterbored to sustain a cylinder bushing 44 which is provided at its lower margin with an upstanding rim 45, and which carries the suspending arms 46. The arms 46 carry a central hub 47 upon which is threaded a cup-like guide 48. This guides a piston stop 49 which is urged upward by a coil spring 51.

The member 43 is held to the body 37 by means of T-headed bolts, as indicated, and a gasket 52 seals the two parts together and also provides a sealed joint with the bushing 44.

Working in the bushing 44 is a piston 53. This is formed with a downwardly projecting pilot or stem 54 which works in a guideway formed in the hub 47 and is in thrust relation with the piston stop 49. The stem 54 has an axial port 55 extending from the upper face of the piston and communicating with a lateral port 56 which discharges into an annular groove 57.

The piston carries on its lower face a gasket 58 which in the lowermost position of the piston, seals against the rim 45. The parts are so dimensioned that in the uppermost position of the piston stop 49 the gasket 58 is held slightly above the rim 45, while the groove 57 is slightly below the upper margin of the hub 47. The fit of the stem 54 in the hub 47 is such as to restrict the flow of air from the space above the piston 53 to the chamber 43, to a desired charging rate. The purpose of the gasket 58 and spring 51 is to permit sealing of the piston on its gasket during heavy charging flow, and the freeing of the gasket from the rim 45 when charging flow ceases, to the end that the charging rate is controlled by the fit of the stem 54 in its guide, and the gasket may never freeze to the rim 45.

The piston 53 carries three upstanding pins 59, two of which are visible in Fig. 2. These pins project upwardly into the space within the body 37 by way of three passages formed in the lower wall of the body 37. Ample clearance is afforded around the pins 59 for the free flow of air from the space within the body 37 to the space immediately above the piston 53. Each pin 59 is provided with two spaced shoulders 60 and 61, and the reduced upper portions of the pins each pass through lugs formed on two superposed valve members 62 and 63.

The lower valve 62 carries a rubber gasket, clearly shown in the drawings, which seals against an annular valve seat 64 carried by an upstanding boss within the body 37. This gasket is retained by a tubular member 70 which is threaded into and extends through the valve 62, thus providing a port through the valve. The upper valve 63 has a rubber-gasketed face which seals against the valve seat 65 formed on the upper end of member 70. The two valves are urged in a closing direction by a coil spring 66 which is confined at its lower end in a cup 67 on the upper face of the valve 63, and is confined at its upper end by a tubular guide 68 pressed into the cap 42.

The shoulders 60 and 61 on the pins 59 are so located that the piston 53 may move upward a limited distance without lifting either valve. At the upward limit of such motion the groove 57 is just above the hub 47, at which time the port 56 limits the back flow from the chamber 43 to the brake pipe to a valve which will reduce the pressure in chamber 43 at a service rate. Further rise of the piston 53 will unseat the valve 63, whose effective area, and consequent resistance to opening, is relatively small. Opening of the valve 63 relieves the pressure on the upper side of piston 53 and also on the upper side of the valve 62. Hence the upward tendency of piston 53 is sharply increased, the resistance of the valve 62 to opening is reduced, and extremely rapid action is secured.

The valves 62 and 63 control the flow to vent ports 69. These lead in opposite directions to atmosphere, and one is visible in Fig. 2. The other is similar and forward of the plane of section.

The brake pipe vent valve just described will be recognized as belonging to a general species known in the air brake art. The details of the piston and valve construction are novel, but are not claimed herein, as they form the subject matter of application Serial No. 563,619, filed September 18, 1931, as a continuation of application Serial No. 470,755, filed July 25, 1930.

While I prefer the vent valve illustrated, because of its very large capacity and rapid action, other approximate equivalents might be substituted.

*Operation of brake pipe vent valve*

The operation of the valve is as follows:

When brake pipe pressure rises, as it does, for example, during release of the brakes, air flows from the brake pipe through the chamber 35 into the chamber within the body 37 and to the space above the piston 53, forcing this piston downward. Under ordinary circumstances, the piston 53 will move down far enough to seat the gasket 58 on the rim 45 and the space within the chamber 43 will be charged at a rate controlled by the fit of the stem 54 in the hub 47. This charging rate is made slow enough to insure that the chamber 43 will not be overcharged. If brake pipe pressure be reduced at a rate not exceeding the maximum service rate, the piston 53 will move upward until the shoulders 61 engage the lugs on valve 63, at which time the chamber 43 will be vented by flow back to the brake pipe, flow taking place through the port 56 and passage 55.

In the case of a rapid drop in brake pipe pressure, such as occurs in emergency application, the possible back flow is inadequate to reduce the pressure in chamber 43 as fast as brake pipe pressure is reduced. The resulting differential pressure forces the piston 53 to its uppermost position, opening the valves 63 and 62, and locally venting the brake pipe. This local venting accelerates the pressure drop in the brake pipe. In this way an emergency drop in brake pipe pressure initiated by the engineer's brake valve is propagated and accelerated in its travel throughout the length of the train at an extremely rapid rate.

It is characteristic of the present invention that the propagation of the emergency pressure drop is controlled solely by the emergency vent valve and is wholly independent of the triple valves. Moreover, the function of the vent valves is controlled solely by the rate of brake pipe pressure drop, not by the degree of such drop. Consequently, an undesired emergency can not be initiated by a sticking triple valve as commonly happens where the emergency function is performed by a part of the triple valve mechanism. Furthermore, it is possible to initiate an emergency pressure drop, and accelerate it through the operation of the vent valves, even after a substantial service reduction of brake pipe pressure has been made. These characteristics result in greatly improved operation of the brake system as a whole.

*Connections to triple valve*

The branch pipe 71 leads to the triple valve from the lower side of the connection 32, as shown, and is equipped with the usual cut-out cock 72 and centrifugal dust collector 73. The branch pipe is connected to the triple valve by means of the usual union 74 equipped with the usual strainer thimble 75, see Figs. 1 and 2.

*Construction of triple valve*

The triple valve is shown diagrammatically in Figs. 3 to 11, and as actually constructed in Figs. 12 to 22. In most instances the diagrammatic arrangement involves shifting of certain component mechanisms, to bring them into a common plane of section, the location of all ports in the plane of section, and similar changes which do not affect the function of the device. An incidental result is a change in the form and dimension of certain passages, which changes are without functional significance, it being clearly understood that the diagrammatic figures do not show the correct proportioning of all ports. The porting of the slide valve and its seat, on casual inspection, will appear to depart in the diagram quite radically from the porting in the valve as actually constructed, for the reason that in the actual construction certain expedients have been adopted to simplify manufacture and reduce the size of the parts.

The device will first be explained on the basis of the diagrammatic showing, with only occasional reference to the structure shown in Figs. 12 to 22. After the operation has been traced, the porting of the slide valve and its seat as actually embodied will be explained.

The union 74 connects the brake pipe directly to the lower body portion 76 of the triple valve. This is of special form to support and house the build-up delay mechanism hereinafter described. The remaining body structure of the triple valve consists of the main body portion 77, which from Figs. 12 and 14 will be recognized as identical with that used for a standard type K triple (except for additional porting), the delay cylinder insert 78 and the front cap 79, which last is specially modified to guide and support a double spring graduating stem.

The front cap gasket 81 is similar in form and identical in function with the present standard gaskets. The cylinder bushing 82 departs from present standards in the omission of the charging groove. The triple piston 83 and the graduating button 84 are unchanged from the corresponding parts of the type K triple valve. The retard stop 85, retard stop spring 86, the guide cap 87 for the retard stop and its bushing 88, are functionally similar to corresponding parts of the K triple, but embody a new construction designed to permit the use of a heavier retard stop spring and to provide a longer guiding surface for the retard stop. This is rendered advisable by the use of the heavier spring.

The parts numbered 85 to 88 are not herein claimed specifically, but form the subject matter of my application for patent, Serial No. 559,996 filed August 28, 1931.

The valve chamber bushing 89 is changed only in the porting of its slide valve seat 90. The same is true of the triple slide valve 91. The graduating valve 92 is unchanged from that used with the K type triple valve. The graduating valve is embraced closely by the usual notch in the piston stem 93 and a positioning pin 94 is used to prevent wrong assembly.

The slide valve 91 has limited lost motion relatively to the stem 93, as is clearly indicated in Figs. 3 and 12, and is held to its seat by the usual bow-spring 95. The graduating valve 92 is seated by a leaf spring 96. The auxiliary reservoir 97 is unchanged, but instead of mounting the body 77 directly on the head of the reservoir, a ported annular filler piece 98 is interposed, gaskets 99 being used on both faces to secure tight joints with the reservoir and with the body of the triple valve respectively. The filler piece 98 affords connection for the pipe 101 which leads to the supplemental reservoir 102 (See Figs. 1 and 15).

The reservoir 102 is of ordinary form and its volume slightly exceeds that of the auxiliary reservoir 97. In actual practice use has been made of an auxiliary reservoir, whose capacity is 2440 cubic inches and a supplemental reservoir whose capacity is 3088 cubic inches.

The brake cylinder pipe 103 leads through the auxiliary reservoir 97 to the brake cylinder (not shown) as is standard practice in freight brakes. The pipe 103 registers with a passage in the filler piece 98 which forms a continuation of the brake cylinder passage 104 in body 77.

As stated, the front cap 79 is modified to carry a special graduating stem 105 which is guided in the guideway in the plug 106. The plug 106 is screwed into and seals an opening formed in the front cap to receive it. The stem 105 carries a collar 107 which limits the forward motion of the stem by collision with seat 108 in the front cap, and also serves as a seat for a light graduating spring 109. When the stem 105 is forced back a slight distance, the collar 107 engages a flange 111 on ring 112 which is normally held against the seat 108 by a second and relatively stiff graduating spring 113.

The action of the graduating stem and retard stop can now be described:

In normal release position (Figs. 3, 4 and 12) the end of stem 93 engages retard stop 85 without compressing spring 86. In restricted release position (Fig. 5) the stem 93 forces stop 85 inward against the resistance of spring 86 until rim 221 on the piston 83 seats against the end of bushing 89. At such time the groove 219 affords communication to the annular area outside rim 221.

In quick service position (Fig. 6) stem 93 is arrested when button 84 engages stem 105, without compressing spring 109. Full service position (Fig. 7) is assumed when stem 105 is forced back compressing spring 109 until collar 107 engages flange 111 without compressing spring 113.

In emergency and over reduction positions (Fig. 8) both springs 109 and 113 are overpowered, and piston 83 seats against gasket 81.

The proper positioning of the slide valves involves proper correlation of the positions of seat 108 in the front cap, flange 111, the amount of lost motion between stem 93 and valve 91, and the locations of the ports.

The insert member 78 is mounted in a recess, the upper portion of which is the space formerly occupied in the K triple valve by the emergency piston and emergency valve, and the lower portion of which is formed in the lower body portion 76. Insert 78 is formed with a flange 114 which seats on a shoulder formed in the member 76 to support it. When so supported the upper face of the flange is flush with the upper face of the member 76 which mates with the body 77. The lower end of the member 78 is sealed against the bottom of the recess in the member 76 by a ported gasket 115. A second gasket 116 seats on the upper face of the member 76 and on the upper face of the flange 114 and seals the joint with the body 77. The details of construction of this insert and its relation to the parts of the body, form the subject matter of another application, Serial No. 560,805, filed Sept. 2, 1931 and are not here specifically claimed.

The upper end of the insert 78 seals in the body 77 by means of a ring gasket 117. The upper end of the insert 78 is reduced in diameter to afford an annular passage 118 around the insert 78 which communicates directly with the brake cylinder passage 104. This, as already explained, is in direct communication with brake cylinder pipe 103. The gaskets 116, 117, isolate the passage 118 from the space 119 within the insert 78. The space 119 communicates directly with service and emergency ports in the seat for slide valve 91, as will be fully explained.

A removable choke plug 121 affords a restricted passage from the space 119 to the annular passage 118. The plug 121 is made removable to permit the substitution of plugs having choke ports of different sizes. This choke port controls the rate of brake cylinder pressure built up in the second stage of emergency, and the purpose of changing the size of the choke is to permit control of the rate of build-up.

Pressed into the upper end of the insert 78 is a slide valve seat bushing 122 upon which is slidably mounted a shifting seat 123. The upper end of the bushing 122 is open to the space 119. Below the bushing 122 the insert is formed with a slightly larger chamber in which is pressed a cylinder bushing 124 which serves as a cylinder for the piston 125. This piston is provided with an ordinary snap ring 126. Tight sealing of the piston is not, however, essential, and the ring 126 may be omitted. The piston 125 has a stem 127 which projects upward through the bushing 122 and is guided at its upper end by a rounded head 128 which slides in the bushing and is guided thereby. The sliding seat 123 has limited lost motion between the head 128 and a shoulder 129 on the stem 127, as clearly shown in Figs. 3, 9, 10, 11 and 14.

The stem 127 is further provided with a notch which closely confines a slide valve 131 so that the slide valve moves relatively to the shifting seat 123 when the stem 127 reverses its motion. The shifting seat 123 is urged to its seat by a bow-spring 132, and the slide valve 131 is seated upon the shifting seat by a leaf spring 133 (see Figs. 9 to 11 inclusive). The upward motion of the piston 125 is limited by stop pins 134, one of which appears in Figs. 3, 9 to 11, and 14, so that the piston can not seal against the end of the bushing 122. Thus the entire area of the piston 125 is subject on its upper side to the pressure within the bushing 122 which is substantially the same as the pressure within the chamber 119 because of the presence of the passage 135. This passage is formed partly in the insert 78 and partly in the bushing 122, as clearly shown in Figs. 9 to 11.

The entire area of the piston 125 is subject on its lower face to brake cylinder pressure communicated by way of the annular passage 118 and passage 136. There are two ports in the valve seat formed on bushing 122, an atmospheric exhaust port 137 and a port 138 which leads to a portion of the delay mechanism hereinafter described. Shifting seat 123 has two ports, 139 and 141, which extend through the shifting seat and which are formed on the surface which contacts the valve seat on bushing 122 with elongations. These elongations insure that in all positions of the shifting seat 123 the port 139 will be in communication with the port 137 and the port 141 will be in communication with the port 138.

In the uppermost position of the parts, as shown in Fig. 3, port 141 is uncovered by the slide valve 131 so that pressure from the space 119 is admitted by way of the ports 141 and 138 to the delay mechanism.

The slide valve 131 is formed with a recess 142 which, when piston 125 moves downward, serves to connect the ports 137 and 138, under which condition the delay mechanism is vented to atmosphere. The reason for using the shifting seat 123 is to permit the piston 125 to have a reasonably long travel and yet shift the slide valve 131 to change the port connections by a small initial travel of the piston from either limiting position after a reversal of motion. Where this is not important, the shifting seat may be omitted, in which case the valve 131 would cooperate directly with seat 122 and the ports 137 and 138. Better action can, however, be secured by the use of a shifting seat in most cases.

Supported in the lower body portion 76 and in the space immediately below the piston 125, is a spring mechanism for controlling the downward motion of the piston 125 and its connected parts. This spring mechanism is constructed as follows:

A ported cup 143 sustains within it a disk or base 144. Screwed into this base is a combined guide and stop made in the form of a headed screw 145. Vertically slidable on the screw 145 and limited in its upward motion by the head thereof, is a flanged plunger member 146. Confined between the flange on the plunger 146 and the base 144 is a coiled compression spring 147. Surrounding the spring 147, and reacting between the piston 125 and the base 144, is a second and less heavily stressed tensioned compression spring 148.

It follows from the construction just described that the initial downward movement of the piston 125 sufficient to shift the slide valve 131 so that the recess 142 connects the ports 139 and 141, occurs against the resistance of spring 148 only (see Fig. 9). Any further motion is resisted by both springs. The effect is to offer a resistance to the downward motion of the piston 125 which is subject to a definite increase and change of rate as soon as the piston has traveled far enough to shift the slide valve. The importance of this double spring arrangement arises in connection with long trains, and will be explained in detail in connection with the operation of the device. This spring construction is the chief departure from the arrangement described and claimed in the prior application Serial No. 439,743, above identified.

In Fig. 24, I show the possible substitution of a simple coil spring 148$^a$ as proposed in said prior application. In Fig. 23, I show a coil spring 148$^b$, which offers characteristics intermediate between the structure shown in Fig. 23 and the preferred double spring construction. With a conical spring, such as shown in Fig. 23, the resistance of the spring increases at an increasing rate as the spring is compressed. In Fig. 25, I show the substitution of a further type of spring 148$^c$ which still more closely approximates the preferred double spring arrangement. The spring 148$^c$ has a middle portion of relatively large diameter made up of say two coils, and end portions of relatively smaller diameter which are cylindrical spiral coils. The spring is made of one continuous piece of wire of uniform gage. The two middle coils, which because of larger coil diameter yield more readily, collapse upon each other, before the end coils are very greatly distorted. In this way a single spring is produced in which the resistance builds up slightly until the middle two coils contact and then builds up more rapidly. The spring is designed so that the middle two coils will contact when the piston 125 has moved far enough to shift valve 131 so that it connects the ports 139 and 141. (This is the position shown in Fig. 9).

The two-spring arrangement is preferred for long trains. The simple coil spring 148$^a$ is entirely operative. Results approximating those secured with two springs can be had with a single spring of the type 148$^b$, and even a closer approximation can be secured with a single spring such as 148$^c$.

The branch pipe 71 from the brake pipe is connected to the triple valve by the union 74, and brake pipe air is conducted by the passage 149 to a chamber 151. This is provided with a dam 152 and a drain plug 153 designed to arrest and permit the draining away of moisture and grit. The chamber 151 communicates over the dam 152 with a passage 154 by way of a check valve which permits flow from the brake pipe toward the triple valve, but closes against flow in the reverse direction.

The passage 154, as will be observed by an examination of Figs. 12 and 14, passes around the insert 78 and continues thence in the form of a drilled port to the seat of the triple slide valve.

The check valve just mentioned comprises a ported tube 155 and a flanged head member 156 which fits on the upper end thereof. This seals against a gasket and serves as a seat for the ball check valve 157. This check valve assembly and an encircling strainer 158 are both held in place by a threaded plug 159. This check valve and strainer assembly forms the subject matter of Patent 1,847,068, March 1, 1932.

The passage 154 is the charging and quick service passage and terminates in a port 161 in the seat 90 of triple slide valve 91 (see particularly Figs. 4 to 8 inclusive).

As clearly shown in Figs. 3 and 12, there is a passage 162 which leads from the brake pipe connection to the space to the left of the triple piston 83. While, as explained, I prefer to omit the customary charging groove in the cylinder bushing 82 and to charge through a charging port 161 in the triple valve seat, such charging port being controlled by the check valve 157, other methods of charging are known, and might be used without departure from the broad inventive concept underlying the present application. One alternative construction is shown in Fig. 26 and will be described hereinafter.

Formed in the body 76 are two cylindrical recesses, which are axially alined and which are bored from opposite sides of the body 76 (see Figs. 12 and 14). They are separated by a partition 163. The space to one side of the partition is in communication with the brake cylinder passage 104 by way of passages 118 and 136. The space to the other side of the partition 163 is in communication with the brake cylinder passage 104 by way of passage 164 formed partly in the insert 78 and partly in the body 76.

Mounted in the second named chamber and sealed therein by means of a gasket 165 is a cup-shaped member 166 which has an annular valve seat 167. With this seat there coacts a poppet valve 168 whose stem 169 is guided in a hub 171 formed integrally with member 166 and extending through an opening in partition 163, which opening it fits reasonably closely. The valve 168 is urged in a closing direction by a spring 172, which seats against the threaded plug 173 screwed into body 76, and making an air-tight joint therewith. The member 166 has a ported flange which engages the plug 173 so that member 166 is held sealed against gasket 165. The ports in the flange permit free communication with passage 174 which communicates with passage 135 and thus with chamber 119 and space above piston 125.

Mounted in the second named of the alined recesses is a cylindrical bushing 175 which has at its inner end an annular rim 176 of smaller diameter. The bushing is held in place against gasket 177 by a disk 178 which seats on a gasket 179, and which has an inward tubular extension 181 forming a spring guide. The disk 178 is held in place by a threaded plug 182 screwed into body 76 and making an air-tight seal therewith, the plug having an interrupted flange 183 which engages the disk 178 without obstructing the flow of air to and from port 138.

Sliding in the bushing 175 is a cup-shaped piston 184 which is urged inward by a spring 185. When this piston is inward a gasket 186 on the end of the piston seals against the rim 176. In this way the effective area of its inner end, which is subject to brake cylinder pressure, is reduced. The annular area outside the rim 176 is vented by two connected ports 187, 188 which then bridge the length of the piston 184 and establish communication with port 138 by way of tubular extension 181.

When piston 184 starts to move outward against the opposition of spring 185 port 188 is blanked and the entire area of the piston becomes effective, so that the piston moves rapidly to its outer limit of motion, in which position it seals against gasket 179.

In the inner position of piston 184 the valve 168 is held open, since the piston is in thrust engagement with the stem of the valve. When piston 184 is in its outer position, spring 172 holds valve 168 closed, assisted by pressure fluid arriving from chamber 119 via passage 174. This valve, called a change-over valve, forms the subject matter of, and is claimed in, application Serial No. 561,289, filed September 4, 1931.

The mechanism of the triple valve has now been described except for the porting of the slide valve seat, the slide valve and the graduating valve. The diagrammatic showing of Figs. 3 to 8, inclusive, will first be described, after which the equivalent actual arrangement of Figs. 17 to 21 will be explained.

The slide valve seat is merely a flat surface machined in the lower portion of bushing 89, as usual, and dimensioned to receive and aline the slide valve 91. The graduating valve 92, as explained, moves with the piston stem 93. There is lost motion between the stem 93 and the slide valve 91, so that upon initial motion in either direction the graduating valve 92 shifts relatively to the slide valve 91 which is picked up later. The port 161 has already been mentioned. It is the port through which brake pipe air is vented in quick service, and through which air flows to recharge both reservoirs in normal release, and to recharge the auxiliary reservoir alone in restricted release.

Referring now specifically to the diagrammatic showing of Figs. 3 to 8 inclusive:

There are three ports 189, 191 and 192 which lead to the space 119 and consequently to the choke port 121 and brake cylinder passage 104. Port 189 is the port through which the brake pipe is vented to brake cylinder in quick service. Port 191 is the main service port through which brake cylinder pressure is exhausted in normal release and restricted release and through which auxiliary reservoir air flows to the brake cylinder in quick service and full service positions. Port 192 is the emergency port, through which air from the auxiliary reservoir 97 and supplemental reservoir 102 flows to the brake cylinder in emergency and over-reduction position. There are two distinct exhaust ports 193 and 194. Port 193 leads by way of annular passage 195 around the bushing 89 to pipe 196 which normally would be equipped with an ordinary retainer valve (not shown). It is the port through which the brake cylinder is exhausted in both normal and restricted release. The independent exhaust port 194 opens directly to atmosphere and is not controlled by the retainer valve at any time. It functions only in restricted release position when it offers a restricted vent to atmosphere from the supplemental reservoir 102.

Port 197 is the supplemental reservoir port. It communicates with reservoir 102 by way of pipe 101, and is the port through which the supplemental reservoir is charged in normal release, partially vented in restricted release, and through which supplemental reservoir air flows to mix with auxiliary reservoir air in the emergency and over-reduction position.

The slide valve 91 has ports, some of which are solely in the lower face and others of which lead through the valve to the top face.

The port 198 leads from the bottom to the top face and has as its lower end a restricted extension 199. In normal release position port 198 registers directly with seat port 161 permitting full charging flow. In restricted release the restricted extension 199 registers with port 161 throttling the charging flow. At this time, as will be further explained, the feed flow to the supplemental reservoir, is cut off. In all other positions the port 198 is blanked by graduating valve 92 and is out of register with all ports in the seat.

The ports 201 and 202 together with the recess 203 in the graduating valve 92, offer the quick service passage through which the brake pipe is vented to the brake cylinder in quick service position (see Fig. 6). In quick service position they register respectively with the ports 161 and 189. They are devoid of function in all other positions of the valves 91 and 92, being disconnected from each other or out of register with ports in the seat 90.

Fig. 6 shows quick service position, and in this position the port 161 is connected to the port 189 by the ports 201, 202 and the recess 203. This permits brake pipe air to flow to the brake cylinder. Port 204 is a supplemental reservoir charging port and functions only in normal release, at which time it registers with port 197 in the seat 90, and is in register at its upper end with port 205 in the graduating valve 92.

Port 206 is the service port. In quick service position and in full service position it is in partial and complete register, respectively, with service port 191 in seat 90, and its upper end is cleared by the graduating valve 92 which closes it in normal release and restricted release positions. The size of this port is controlled by considerations which will be discussed in connection with operation, service position.

The graduating valve 92 closes port 206 in service lap position, service lap being a position like full service, except that the graduating valve 92 is moved to the right by the amount of lost motion permitted between the slide valve 91 and the stem 93.

Port 207 is the emergency port and functions only in emergency position when it registers with port 192 in seat 90. In this position the right hand end of the valve 91 clears the supplemental reservoir port 197 so that both auxiliary reservoir air and supplemental reservoir air flow through the port 207 and port 192 to the space 119.

The port 208 is a bridging port which functions only in restricted release position. In that position it connects ports 194 and 197 to permit a very slow release of supplemental reservoir air to atmosphere.

The recess 209 is the exhaust port for brake cylinder air. At one end, as shown, it communicates with a small throttling port 211. The recess 209 functions only in normal release and restricted release positions, in both of which it serves to connect ports 191 and 193. In normal release the recess 209 bridges the ports 191 and 193, affording free communication (see Fig. 4) but in restricted release the recess 209 communicates with the port 191 while the throttling port 211 with which it communicates, registers with the port 193. This reduces the exhaust flow to the capacity of throttling port 211 and thus delays release.

The relative proportions of the various ports which secure the desired rates of flow, are subject to some variation and are controlled by considerations which will readily suggest themselves to those skilled in the art. There is, however, one important relation of ports to which specific reference must be made in considering the normal release position (Fig. 4). It will be observed that the ports 198 and 204 are both controlled by the graduating valve 92 and that the port 204 is of slightly greater diameter than port 198 so that motion of the graduating valve to the left sufficient to close the port 198 completely, will nevertheless not completely close the port 204. This detail is important in connection with the normal release action of triple valves at the end of long trains, as will be explained hereinafter.

In order to secure a compact structure and one which could be manufactured simply, the slide valve seat, slide valve and graduating valve are ported, as indicated in Figs. 16 to 21 inclusive, though various other arrangements might be used.

The seat 90 for the slide valve, as shown in Fig. 16, has ports 161, 191, 193, 194 and 197 corresponding to the similarly numbered ports in Figs. 2 to 8, but located somewhat differently. In Fig. 16 a single port performs the function of port 189 in quick service, and the function of port 192 in emergency. Consequently, on Fig. 16, this port is designated by two legends, "189 in Q. S." and "192 in E". Both ports lead to the space 119, and it is thus possible to provide a single port with a double function.

Referring now to Figs. 17 to 20 inclusive, the following ports are designated by the same numerals used on Figs. 3 to 8, namely, port 198 with its extension 199, ports 201, 204, 206, 207, 209 and 211. The upper end of port 202 is indicated on Fig. 17. On the lower face of the valve this port communicates with an L-shaped recess visible in Fig. 19. In Fig. 19, the outer or left end of the port 208 is visible, and this communicates through a drilled passage in the body of the slide valve with the same L-shaped recess with which the port 202 communicates. Consequently, the L-shaped recess is designated on Fig. 19 by two legends, "208 in R. R." and "202 in Q. S.". These legends signify that this recess functions as a part of the port 202 in quick service and as a part of the port 208 in restricted release.

As clearly shown in Figs. 17, 18 and 19, the emergency port 207 takes the form of a notch cut in the side of the slide valve 91.

The graduating valve shown in Fig. 21 is provided on its lower face with a recess 203 which corresponds to the similarly numbered recess shown in Figs. 3 to 8. There is, however, no through port corresponding to the port 205 of Figs. 3 to 8. Examination of Fig. 17, however, will show that the ports 204 and 198 are laterally spaced from each other in a direction transverse to the motion of the slide valve and are slightly offset longitudinally, so that they are each controlled by the outer (left hand with reference to Fig. 21) edge of the graduating valve 92. Consequently, the function of the port 205 is performed by the edge of the graduating valve.

It is believed that anyone skilled in the art can readily trace the operation of the slide and graduating valves from Figs. 17 to 21 inclusive, in the light of the above explanation. There is no functional difference between this particular embodiment and the diagrammatic showing of Figs. 3 to 8. Furthermore, various equivalent arrangements might be adopted, the particular one chosen for illustration in Figs. 16 to 21 having been developed to simplify manufacture. In actual practice, the ports are made by drilling and plugging, a familiar expedient in this art, but in tracing the ports in Figs. 17 to 19, no attempt has been made to show the actual path of the drilled ports, and the plugs, as this would result in undue confusion of the drawings. In these figures the dotted lines have been differentiated to minimize the confusion of ports which appear to overlap in projection.

*Modified structure with charging around triple piston*

The control of charging flow by ports 198 and 199 on triple slide valve 91, and by check valve 157, produces a valve which is very sensitive to reductions of brake pipe pressure. While this is a desirable characteristic, the sensitivity of the triple valve is so great that undesired applications may at times be caused by brake pipe leakage, or by erratic action of the feed valve (associated with engineer's brake valve).

While it is believed that modern equipment, especially modern large capacity feed valves, will meet the requirements, it is possible that much of the older equipment now in use will not.

To meet such unfavorable conditions, various expedients may be adopted, for example, that shown in Fig. 26. Here the cylinder bushing 82 is formed with a feed groove 215. With such construction port 198 and its extension 199 are omitted from slide valve 91.

In normal release, charging flow is through groove 215. In restricted release flow is through groove 215, and thence through slot 219 in rim 221 on piston 83. The flow is thus throttled by slot 219, the rim 221 being then sealed against the end of bushing 89.

OPERATION

*Charging and release—General considerations*

Assuming that an application has been made the engineer moves the brake valve to full release position, supplying air to the brake pipe 31 under main reservoir pressure. Air from the main reservoir flows back through the brake pipe and entering the space above the piston 53 of the emergency vent valve, charges the emergency vent valve as already described. After an emergency application this motion ensures the closing of the valves 62 and 63. These valves do not open in service applications, so that in release following service the piston 53 merely moves down, carrying the pins 59 out of contact with the valve 63.

Air also flows through the branch pipe 71, cock 72 and dust separator 73, to the brake pipe connection 74 of the triple valve. Thence it flows by way of passage 162 to the space to the left of the piston 83, forcing the piston to the right. Brake pipe pressure, particularly at the forward end of the train, is abnormally high during the initial stage of release and it follows that the triple pistons and their connected slide valves at the front end of the train will be shifted to restricted release position (Fig. 5), while those further back in the train will be shifted to normal release position (Fig. 4). In this respect the valve functions substantially as does the K-type triple valve.

The proper practice for the engineer is to shift the engineer's brake valve to running position from release position as soon as the triple valves have responded throughout the train and have moved to one or the other release position. In running position of the engineer's brake valve, main reservoir air is fed to the brake pipe through a pressure reducing valve known as the feed valve, and this functions to limit the brake pipe pressure to the normal value which is materially less than main reservoir pressure. It often happens, however, that the engineer leaves his valve in full release position too long, and the resulting tendency is to overcharge the auxiliary reservoirs at the forward end of the train. The K triple valve opposes this tendency to overcharge by the restricted recharge function which occurs in restricted release position, but overcharges do occur nevertheless with K triple valves. One of the characteristics of the present valve is its ability to dissipate such overcharging before an undesired reapplication of the brakes can occur when the engineer's brake valve is shifted from release to running position.

The valves toward the rear end of the train, as has been stated, move only to normal release position, which will now be discussed.

*Normal release*

In normal release position recharging occurs past the check valve 157, through the charging port 161 in the slide valve seat, and thence through charging port 198 in slide valve 91 to the slide valve chamber. This is in direct communication with the auxiliary reservoir through the retard stop mechanism which is ported for that purpose. In the first stage of normal release air will flow back from the supplemental reservoir 102 through the pipe 101 and port 197, port 204 and port 205 to the slide valve chamber. In other words, the supplemental reservoir pressure first equalizes with the auxiliary reservoir pressure. After such equalization has occurred brake pipe air flowing to the slide valve chamber from the brake pipe, will flow to both reservoirs. In this way the supplemental reservoir serves to give a partial recharge to the auxiliary reservoir as soon as the triple valve moves to normal release position.

This tendency toward partial recharge would be attended with difficulty at the extreme rear end of long trains except for the special relation described with reference to ports 204 and 198. At the rear end of a long train brake pipe pressure rises very slowly. Consequently as soon as the triple valve moves to normal release position the feed back from the supplemental reservoir 102 to the slide valve chamber tends to raise the pressure on the right or inner side of piston 83 faster than brake pipe pressure is rising on the left or outer side of the piston 83. In such case there is a tendency for the triple piston to start outward toward application position. In this motion the graduating valve throttles port 198 more rapidly than port 204, thus slowing up the feed back from the supplemental reservoir.

It follows that under these conditions the triple valve does not move far enough to reach quick service position nor is the port 204 completely blanked by the graduating valve. Consequently, as brake pipe pressure is further built up and after reservoir pressures have equalized, the slide valve will shift to open port 198 and the reservoirs will be charged in the normal manner.

In normal release position the brake cylinder is rapidly exhausted to atmosphere by way of pipe 103, passages 104, 164, 174, 135, port 191, recess 209 and port 193. It is here assumed that the retainer valve, if used, is in its normal open position.

Restricted release

It has been stated that triple valves in the front portion of the train move to restricted release position (Fig. 5). In this position port 204 is out of register with port 197 so that the supplemental reservoir is isolated from the auxiliary reservoir. The charging flow through the ports 161 and 198 is restricted because port 161 now registers with the restricted extension 199 of port 198. Consequently, flow to the slide valve chamber and auxiliary reservoir occurs at a restricted rate. This reduces the drain on brake pipe air so that the rising pressure wave in the brake pipe is propagated more rapidly toward the rear of the train. At the same time release of the brake cylinders at the front end of the train is delayed because in restricted release position the restricted port 211 is in register with the exhaust port 193. Hence the forward brakes release slowly and hold the train bunched.

In these aspects of restricted recharge and release the triple valve presents the characteristics of the K triple valve, but an additional important function is included. In restricted release the supplemental reservoir 102 is bled to atmosphere by way of ports 197, 208 and 194.

Normal release after restricted release

Under normal conditions of operation the pressure drop in the reservoir 102 during restricted release is of the order of ten pounds per square inch. As soon as pressure in the brake pipe 31 levels off to the normal value set by the feed valve, those triple valves which had moved to restricted release position will be shifted to normal release position by the retard stop spring 86. When this occurs reservoir 102 will be ten pounds below its normal pressure. If the auxiliary reservoir 97 has been overcharged in restricted release, it will then be above normal pressure, and there will be danger of a reapplication of the brakes. This danger is eliminated because equalization of the pressures in the auxiliary reservoir and in the supplemental reservoir will occur when the valve moves to normal release position as a result of register of the ports 197, 204 and 205.

When the triple valve shifts from restricted to normal release positions any overcharge in the auxiliary reservoir is promptly dissipated, and any remaining air in the brake cylinder is rapidly exhausted, the latter exhaust occurring by way of the ports 191, 209, 193. Here again it is assumed that the retainer valve is in its normal open position.

Operation of modification of Fig. 26

Referring to the modification shown in Fig. 26 and remembering that with the structure of Fig. 26 the port 198 and its extension 199 are eliminated so that there can be no charging flow past the check valve 157, normal charging occurs through the groove 215 to the slide valve chamber. In restricted release the rim 221 seats against the end of bushing 89. Consequently, charging flow is then by way of groove 215 and slot 219. The throttling effect of slot 219 ensures the necessary delay in charging flow. Otherwise the charging function is the same as described in connection with the preferred construction.

Quick service position

When the engineer makes a service reduction of brake pipe pressure the triple piston 83 moves to the left until it is momentarily arrested by the graduating stem 105 in quick service position (Fig. 6). In this position the service port 206 is opened by the graduating valve 92 and is in partial register with the service port 191 in the seat. At the same time ports 161 and 189 in the seat register with ports 201 and 202 in the slide valve 91, which are then connected by the recess 203 in the graduating valve 93. Thus a restricted flow from the auxiliary reservoir to the brake cylinder occurs, and at the same time brake pipe air flows past check valve 157 and through the quick service ports 161, 201, 203, 202, 189 to the brake cylinder. This quick service flow of brake pipe air accelerates the propagation of brake pipe pressure reduction throughout the train and speeds up the response of successive triple valves toward the rear end of the train.

Auxiliary reservoir and brake pipe air starting to flow through ports 206 and 191 reaches the brake cylinder partly by way of choke 121 and partly by way of passages 135, 174, 164, 104 and pipe 103. The flow of brake pipe air is momentary, for the accelerated drop in brake pipe pressure causes the piston 83 to overpower the spring 109 and move to full service position in which collar 107 is arrested by flange 111 on ring 112.

Full service position

In this position quick service port 161 is blanked (see Fig. 7) so that venting flow from the brake pipe to the brake cylinder is terminated. The service port 206 now fully registers with the service port 191 in the seat so that auxiliary reservoir air flows to the chamber 119 and thence by the two paths already described to the brake cylinder until the service port 206 is lapped by the graduating valve.

The valves here disclosed can be given two different operative characteristics in service, depending upon the capacity of the port 206. Let us assume that the port 206 is so small that the rush of auxiliary reservoir air in service position will be insufficient to force the piston 125 downward against the resistance of spring 148. In such case the valve 168 remains open and the major flow to the brake pipe occurs by way of passages 135, 174, past valve 168, through passage 164 and passage 104, to brake cylinder pipe 103. There will of course be a minor flow through the choke port 121.

In both quick service and full service position the supplemental reservoir port 197 is blanked by the slide valve 191 so that no air flows from the supplemental reservoir to the brake cylinder. When auxiliary reservoir pressure has dropped slightly below equalization with brake pipe pressure the piston 83 moves back at least until the graduating valve 92 blanks the service port 206.

In long trains there is a tendency, after a service reduction of brake pipe pressure has been made, for surges or waves of pressure in the brake pipe to run back and forth along the train. These surges naturally affect the triple valve, and if it passes through quick service position quick service venting has the effect of accentuating or perpetuating the pressure waves in the brake pipe. This phenomenon is well known in connection with the K triple valve and has greatly limited the practicable capacity of the quick service port. If the port were made large enough to give effective quick service venting the valve would become very unstable because of the wave action in the brake pipe under certain conditions. Hence the design has been standardized on a size of quick service port smaller than is desired.

It is possible to minimize this difficulty with the valve here described by making the service port 206 so large that the rush of auxiliary reservoir air through this port will build up an initial pressure on the piston 125 sufficient to move it downward. When this happens the valve 131 shifts on the shifting seat 123, connecting ports 137 and 138 and thus venting the space to the right of the piston 184 to atmosphere. The piston 184 remains in its inner position, however, and continues to hold the valve 168 open so that air flows from the chamber 119 through passages 135, 174, past valve 168 and through port 164 to the brake cylinder. When brake cylinder pressure builds up to a value determined by the strength of spring 185, say approximately fifteen pounds per square inch, it will overpower the spring 185 and start the piston 184 outward. The initial movement exposes the entire area of the piston to brake cylinder pressure, and at the same time blanks the port 188 so that the piston 184 moves to its extreme outer position, allowing the valve 168 to close. The closing of the valve 168 restricts the flow to brake cylinder to the capacity of choke port 121 so that the brake cylinder pressure acting beneath the piston 125 is less than the pressure acting in chamber 119. Thus the piston 125 tends to move to its lowermost position and seat on the gasket 115.

If the triple valve should move to quick service position while the conditions just described continue, there would be very slight venting through the quick service ports, because the pressure in the chamber 119 would be substantially above brake cylinder pressure, and so near to brake pipe pressure that relatively little venting flow from the brake pipe would occur. In this way the quick service venting, after the first venting, is smothered. As nearly as can be ascertained the effectiveness of the quick service vent is then reduced to about one-quarter of its normal value, and hence a larger quick service vent port can be used without danger of stimulating surging or pressure waves in the brake pipe.

Actual tests show decidedly beneficial results and the practicability of using a quick service vent of much greater capacity than would otherwise be possible.

As brake cylinder pressure and the pressure in chamber 119 approach equalization, a point will be reached when the springs 147 and 148 will start the piston 125 upward. The initial upward movement shifts the slide valve 131 relatively to the shifting seat 123 and such shifting will terminate the venting of the space to the right of the piston 184, and will admit pressure fluid from the space 119 to the space on the outer side of the piston 184, forcing piston 184 inward and reopening the valve 168.

The pistons 125 and 184 may or may not go through the entire cycle above described, depending on the intensity and duration of the service application, but while the flow to the brake cylinder is in the second stage, i. e., the restricted stage through the choke 121, the quick service venting flow is reduced as above described.

*Emergency position*

Rapid reduction of brake pipe pressure, whether initiated at the engineer's brake valve, or elsewhere, will cause the emergency vent valves to respond and vent the brake pipe locally on each car, thus greatly accelerating the propagation of brake pipe reduction throughout the length of the train.

If brake pipe pressure is reduced at such a rate that the pressure in chamber 43 (see Fig. 2) can not be reduced through port 55 at a similar rate, piston 53 will be forced upward to unseat the emergency valves 63 and 62. This will occur whether the emergency reduction has or has not been preceded by a service reduction of brake pipe pressure.

The effect of venting the brake pipe as above described, is to cause piston 83 to move to the left, overpowering the springs 109 and 113, and coming to rest with its margin in sealing engagement on the gasket 81. It should also be mentioned at this point that the piston 83 will assume the above named position whenever brake pipe pressure is approximately twelve pounds or more below full equalization with auxiliary reservoir pressure.

With the piston 83 in the position described, the slide valve 91 and graduating valve 92 assume the positions shown in Fig. 8, in which the supplemental reservoir port 197 is cleared by the slide valve 91, and emergency port 207 registers with the emergency port 192 in the seat 90. With the parts in this position, air from the auxiliary reservoir 97 and air from the supplemental reservoir 102 flows through the ports 207 and 192 to the chamber 119. Notwithstanding the fact that there is open communication to the brake cylinder, a substantial pressure is immediately developed in the space 119. With reservoirs of the size at present in use, the pressure developed in the space 119 is approximately forty-five pounds per square inch. This, acting on the piston 125, overpowers the spring 148 and moves the piston 125 downward until it engages the member 146. It will be observed that the initial motion of the piston 125 downward is against the resistance of spring 148 alone. The recess 142 in the slide valve 131 now connects the ports 139, 141, and thus vents the space at the outer side of piston 184 to atmosphere, and the valve 131 interrupts the communication which previously existed from chamber 119 to the space to the outer side of piston 184.

Air then passes from the chamber 119 through the passage 135, passage 174, past valve 168, through passages 164 and 104 to the brake cylinder pipe 103. At the same time the choke port 121 delivers air at a restricted rate from the chamber 119 directly to the passage 104.

The rising brake cylinder pressure is admitted through the annular space 118 and the passage 136 to the space at the inner end of the piston 184. The springs 185 and 172 are so chosen that when brake cylinder pressure reaches a definite value, say fifteen pounds per square inch gage, the piston 184 will start to move outward. The initial movement in this direction blanks the port 188 which previously vented the space outside the rim 176, and at the same time exposes the entire area of piston 184 to brake cylinder pressure. The piston on its outer side is open to atmospheric pressure at this time. Consequently the spring 185 is immediately overpowered and the piston 184 moves to its extreme outer position and seats against the gasket 179. This allows the valve 168 to close against the seat 167 and terminates flow from the chamber 119 to the brake cylinder except that flow which occurs through the choke port 121.

The pressure in the chamber 119 thereupon rises to a value determined by equalization of pressure in the two reservoirs 97 and 102, attaining a value of approximately sixty-eight pounds per square inch. The rising pressure is sufficient to move the piston 125 to its lower limit of motion against the resistance of the springs 147 and 148. In such lowest position it seals against the gasket 115.

The piston is provided with a projecting bead which ensures a tight seal and reduces the effective area of the lower side. This further downward motion does not change the relation of the slide valve 131 to the shifting seat 123, nor is there any change of relation between the ports 139 and 141 in the shifting seat and the corresponding ports 137 and 138 in the bushing 122. The additional motion does, however, develop a greater reactive force in the springs 147 and 148, ensuring the prompt upward motion of the valve 131 at the proper time.

The movement of the piston 184 outward initiates the second stage of emergency application. The duration of the second stage is dependent primarily on the size of the choke port 121. This may desirably be so chosen that brake cylinder pressure will rise from the value attained in the first stage, say fifteen pounds, to another chosen value, say thirty-five pounds, in a chosen period of say eight seconds. With the values just assumed, the combined strength of the springs 147 and 148 should be such that when brake cylinder pressure has risen to thirty-five pounds, the piston 125 will start upward under the combined urge of the two springs, and brake cylinder pressure, which reaches the lower side of the piston through the passages 118 and 136.

The effect of the initial upward motion is to move the slide valve 131 so that ports 139 and 141 are disconnected (see Fig. 11) and immediately thereafter the space 119 is connected by way of ports 141 and 138 with the space at the outer side of the piston 184. As soon as this occurs a preponderating pressure develops on the outer side of piston 184 and this pressure together with the spring 185, will immediately force the piston 184 inward to its limit of motion, unseating the valve 168 and initiating the third stage. The unseating of valve 168 allows rapid flow to be resumed from the chamber 119 through passages 135 and 174 past valve 168 and through passages 164 and 104 to the brake cylinder pipe 103. Rapid equalization of pressures in both reservoirs and brake cylinders now occurs so that brake cylinder pressure reaches its maximum value almost immediately.

The purpose of this sequence of operations is to secure a definite cycle of braking pressures in emergency applications. In the first phase there is a rapid rise of pressure to a point sufficient to ensure that all the brake shoes are forced against the wheels. Experience indicates that a pressure of approximately fifteen pounds per square inch is suitable for this purpose, though other values might be chosen.

The second stage is a slow rise of brake cylinder pressure to a value which has been selected, for example, as thirty-five pounds gage. This slow rise gives an opportunity for the slack to run in and for the train thus to become bunched. Experience indicates that a period of approximately eight seconds is desirable for the second stage, but this period is subject to variation. The duration of the second stage is controlled primarily by the size of choke 121 and secondarily by the combined strength of springs 147 and 148. The combined strength of these two springs determines the brake cylinder pressure at which the second stage ends.

At the end of the second stage the slack will be bunched and the brakes will be effective to produce pronounced deceleration of the train.

The third stage is marked by rapid rise of brake cylinder pressure to the maximum attainable. This maximum is dependent on the size of the two reservoirs with reference to the size of the brake cylinder and the length of piston travel.

The effect of the shifting seat 123 will now be more readily understood. It permits a relatively long travel of the piston 125 and ensures that the initial movement of the valve 131, after a reversal of direction, will produce the desired shift in relation between the valve 131 and the shifting seat 123.

The purpose in using the dual springs 147 and 148 is to ensure relatively low initial resistance against the downward movement of the piston 125. The spring 148 acting alone offers relatively light resistance. Consequently the piston 125 starts downward under a moderate pressure and is brought to rest when it engages the member 146. As this is spring sustained, arrest of the piston is effected without undue shock.

The lost motion between the piston stem and the shifting seat 123 is such that in this initial downward motion of the piston the seat 123 does not move, but the valve 131 does move, relatively to the seat 123, far enough to produce the necessary change in relationship of the ports.

After the commencement of the second stage the piston overpowers both springs 147 and 148 and moves to its lower limit of motion (Fig. 10). At the end of the second stage it is thus subject to relatively heavy upward spring pressure which will ensure its prompt movement in an upward direction at the proper time.

The piston is shown moving upward in Fig. 11 with valve 131 in a critical position relatively to shifting seat 123, that is, the position in which the port relations change.

*Emergency application following a service application*

If an emergency application follows a service application the emergency vent valves throughout the train will open and vent the brake pipe, because the venting function of these valves is dependent on the rate of brake pipe pressure reduction, not on the relation of brake pipe pressure to auxiliary reservoir pressure, as was the case in the standard K triple. Consequently, the emergency pressure drop will be rapidly propagated throughout the entire length of the train no matter how heavy a service application may have been made previously. It follows that each triple valve 83 will move to emergency position so that on each car supplemental reservoir air, as well as auxiliary reservoir air, is fed to the chamber 119.

If the port 206 is so dimensioned that the piston 125 does not move downward in service applications, and if the service application preceding the emergency application was a light one, the pistons 125 and 184 will act through their regular cycle, as above described, in emergency operation, though the third stage will be reached more rapidly than normally because it will take a shorter time for the brake cylinder pressure to reach the value at which the piston 125 will rise. If said preceding service application has produced a substantial brake cylinder pressure, this pressure, acting beneath the piston 125, will prevent it from moving downward. In such case, the pressures in the two reservoirs and in the brake cylinder will rapidly equalize. This is an entirely satisfactory sequence of operation, because the preceding service application would have conditioned the train for the emergency application.

Referring now to that arrangement of the valve in which the port 206 is so large that the piston 125 is affected in service applications. If an emergency application follows a service application, the effect is merely to supply additional higher pressure to the chamber 119 so that the pistons 125 and 184 will act through their normal three-stage cycle, but this cycle will be expedited somewhat by the more rapid flow through the choke 121. It makes no great difference at what point in the three-stage cycle the emergency application comes; the cycle will be continued and somewhat accelerated.

General structural considerations

The arrangement shown in Figs. 12 to 22 has been found to be compact, economical to manufacture, and offers decided accessibility to the operating parts. It also permits use to be made of many components salvaged from the K triple.

While it is preferred to use a packing ring 126 on the piston 125, this can be omitted. The piston is urged downward initially by rather sharp pressure rise and when it reaches its lowermost position is sealed by the gasket 115. The omission of the piston ring would allow the piston to move more freely, which is a desirable characteristic. Its omission is entirely permissible and further experience with the valve may indicate that it is desirable, particularly in valves so arranged that the piston 125 does not move downward in service applications.

The spaces at opposite sides of the partition 163 are both at brake cylinder pressure, and there is no occasion for a particularly close fit between the stem 169 and its guide in the bushing 171 or between the bushing 171 and the walls of partition 163. In emergency applications the functions of the partition 163 are to prevent the first rush of air from acting on the lower side of the piston 125 and thus rendering its immediate descent uncertain; and also to prevent the first rush of air from causing premature motion of piston 184. These results can be secured, despite slight leakage past or through the partition 163.

The piston 184 seats on gaskets in both its limiting positions. In its travel outward it moves rapidly under a marked pressure differential. In its inward motion, which occurs at the commencement of the third stage, the only leakage would be from the chamber 119 to the brake cylinder port, which is immaterial at the commencement of the third stage. Accordingly, it is unnecessary that the piston 184 make a particularly tight fit in the bushing 175. A free fit is desirable to ensure prompt motion of the piston 184.

The above facts permit quite simple and inexpensive construction of the working parts, and offer substantial advantages from the maintenance and manufacturing standpoints.

While I have shown a particular form of emergency vent valve, other approximately equivalent forms are known and might be substituted. I prefer to locate this vent valve on the brake pipe because this appears to be the best position for the accomplishment of the valve's primary function. It is not, however, essential that the valve be so located, and approximately equivalent results could be secured with other locations.

The time characteristics of the delayed emergency action have been chosen to meet certain preferences, and are illustrative and not limiting.

The retard stop spring 86 in the present device is stronger than retard stop springs used in the conventional K type triple. In the K type triple the auxiliary reservoir was charged through a groove in the cylinder bushing, and in restricted recharge position a groove such as the groove 219 in the rim 221 (Fig. 26) controlled the charging rate. As the charging groove in the cylinder bushing had a considerable capacity, a relatively sharp rise in brake pipe pressure was necessary to shift the triple piston to restricted recharge position. To ensure motion to restricted recharge position, a rather weak retard stop spring was used. Furthermore, after the K triple valve was in restricted recharge position, the effective area on the inner side of the triple piston was reduced to the area within the rim 221. This fact, in conjunction with the weakness of the retard stop spring conduced to sluggish motion from restricted recharge to normal recharge position.

In the preferred form of the present device, the entire inner side of the piston 83 is subject to auxiliary reservoir pressure, and the retard stop spring is heavier. Consequently the prompt and certain return to normal position is ensured.

By using a charging port 161 of relatively small capacity, together with a heavy retard stop spring, it is possible to secure crisp motion between the two release and recharge positions and to keep the charging drain on the brake pipe to a minimum. The fact that the supplemental reservoir is partially vented in restricted recharge position, diminishes the tendency toward reapplication after restricted recharge, and in some degree permits the use of a stronger retard stop spring. It is therefore possible to co-ordinate the size of the charging port, the rate of venting of the supplemental reservoir in restricted release, and the strength of the retard stop spring, to meet the severe requirements of service. By so coordinating the various features above outlined, it is possible to secure a more rapid releasing wave in the brake pipe. Also it is permissible to leave the engineer's brake valve in full release position longer than is practicable with K type valve, and when the engineer's brake valve is shifted to running position, there is a more precise return of the triple valve from restricted recharge to normal recharge position.

The broad idea of venting the supplemental reservoir in restricted release position and then allowing supplemental reservoir pressure to equalize with the auxiliary reservoir pressure in normal release position, is described and claimed in the patent to Campbell, No. 1,632,756, dated June 14, 1927. That patent does not, however, disclose this feature in combination with the control of charging by the slide valve, nor does it include the use of a check valve in the charging port. On the contrary, restricted recharge as disclosed in that patent is of the character used in the K-type triple valve. As explained above, these various features, in combination, may be made to exert a beneficial effect by permitting an increase of strength of the retard stop spring.

The illustrated embodiment has been worked out to avail, so far as possible, of standard parts of existing K-type triples. While the present design is expected to prove satisfactory for adoption as a standard, it is quite possible that a different and more compact design can be worked out for new equipment. Thus, while the specific arrangement illustrated has outstanding value from the standpoint of economy, and is believed to involve patentable subject-matter, departures from this form are possible within the scope of the invention.

What is claimed is,—

1. In a triple valve, the combination of a triple piston; a slide valve and a graduating valve actuated thereby, and having a normal release and recharge position, a restricted release and recharge position, a quick service position, a full service position and an emergency position; a graduating stem engaged by said piston in both service positions and the emergency position; a graduating spring reacting against said stem at all times; a second graduating spring having a lost motion connection with said stem, and adapted to resist further motion thereof after the first spring has been overpowered by partial motion of the stem; and a yielding retard stop tending to arrest the triple piston when the valves are in normal release position and overpowered to permit the valves to move to restricted release and recharge position, said slide valve having a port formed with a restricted extension which controls the recharging function.

2. In a triple valve, the combination of a triple piston; a slide valve and a graduating valve actuated thereby, and having a normal release and recharge position, a restricted release and recharge position, a quick service position, a full service position and an emergency position; a graduating stem engaged by said piston in both service positions and the emergency position; a graduating spring reacting against said stem at all times; a second graduating spring having a lost motion connection with said stem, and adapted to resist further motion thereof after the first spring has been overpowered by partial motion of the stem; a yielding retard stop tending to arrest the triple piston when the valves are in normal release position and overpowered to permit the valves to move to restricted release and recharge position, said slide valve having a port formed with a restricted extension which controls the recharging function; and a check valve preventing back flow through the charging port.

3. The combination of a triple valve, as defined in claim 2, with an auxiliary reservoir and a supplemental reservoir, the slide valve of the triple valve being ported to connect said reservoirs together in normal recharge and release position, and in restricted recharge and release position to disconnect said reservoirs and vent the supplemental reservoir.

4. The combination of a triple valve, as defined in claim 1, with an auxiliary reservoir, and a supplemental reservoir, the slide valve of the triple valve being ported to connect the auxiliary and the supplemental reservoirs in normal release and recharge position and disconnect them in service position, the parts being so dimensioned that the charging port in the slide valve will be closed slightly in advance of said connecting port as the parts move from normal release and recharge position toward quick service position.

5. The combination of a brake pipe, triple valve structure, auxiliary reservoir and supplemental reservoir, said triple valve structure including a slide valve and a graduating valve, and having a charging port controlled by said slide and graduating valves, said slide valve having a port controlled by said graduating valve, which port in release position connects said reservoirs, the parts being so proportioned that as they move from normal release position toward quick service position, said charging port is completely closed before said connecting port is completely closed.

6. The combination of a brake pipe, triple valve structure, auxiliary reservoir and supplemental reservoir, said triple valve structure including a slide valve, slide valve seat and a graduating valve, said seat having a charging port and a supplemental reservoir port, said slide valve having a charging port and a supplemental reservoir connecting port which register with said seat ports respectively in release position, and said graduating valve controlling the communication between said slide valve ports and the auxiliary reservoir, said graduating valve being so related to said ports in the slide valve, that as the triple valve structure moves from release position toward application position, the charging port will be completely closed by the graduating valve before the supplemental reservoir connecting port is completely closed by the graduating valve.

7. The combination of a brake cylinder; a triple valve adapted to supply and exhaust air to and from said brake cylinder; and a pressure build-up delay mechanism interposed between said triple valve and brake cylinder and including an abutment shiftable in one direction by flow of air toward the brake cylinder and in the reverse direction by brake cylinder pressure; a pressure controlling valve actuated by said abutment; a second abutment urged in one direction by the pressure controlled by the pressure controlling valve, and in the reverse direction by brake cylinder pressure; and a flow limiting valve actuated by the second named abutment, and controlling the rate of flow from the triple valve to the brake cylinder.

8. The combination of a brake cylinder; a triple valve adapted to supply and exhaust air to and from said brake cylinder; and a pressure build-up delay mechanism interposed between said triple valve and brake cylinder and including an abutment shiftable in one direction by flow of air toward the brake cylinder, and in the reverse direction by brake cylinder pressure; a loading spring reacting against said abutment in said reverse direction; a pressure controlling valve actuated by said abutment; a second abutment urged in one direction by the pressure controlled by the pressure controlling valve, and in the reverse direction by brake cylinder pressure; and a flow limiting valve actuated by the second named abutment, and controlling the rate of flow from the triple valve to the brake cylinder.

9. The combination of a brake cylinder; a triple valve adapted to supply and exhaust air to and from said brake cylinder; and a pressure build-up delay mechanism interposed between said triple valve and brake cylinder and including an abutment shiftable in one direction by flow of air toward the brake cylinder, and in the reverse direction by brake cylinder pressure; a loading spring of a type which develops a resistance increasing disproportionately fast relatively to its distortion reacting against said abutment in said reverse direction; a pressure controlling valve actuated by said abutment; a second abutment urged in one direction by the pressure controlled by the pressure controlling valve, and in the reverse direction by brake cylinder pressure; and a flow limiting valve actuated by the second named abutment, and controlling the rate of flow from the triple valve to the brake cylinder.

10. The combination of a brake cylinder; a triple valve adapted to supply and exhaust air to and from said brake cylinder; and a pressure build-up delay mechanism interposed between said triple valve and brake cylinder and including an abutment shiftable in one direction by flow of air toward the brake cylinder and in the reverse direction by brake cylinder pressure; a loading spring reacting against said abutment in said reverse direction; a second spring also acting in said reverse direction and adapted to resist movement of said abutment beyond a chosen point; a pressure controlling valve actuated by said abutment; a second abutment urged in one direction by the pressure controlled by the pressure controlling valve, and in the reverse direction by brake cylinder pressure; and a flow limiting valve actuated by the second named abutment, and controlling the rate of flow from the triple valve to the brake cylinder.

11. The combination of a brake cylinder; a triple valve adapted to supply and exhaust air to and from said brake cylinder; and a pressure build-up delay mechanism interposed between said triple valve and brake cylinder and including an abutment shiftable in one direction by flow of air toward the brake cylinder and in the reverse direction by brake cylinder pressure; a pressure controlling valve actuated by said abutment; a second abutment urged in one direction by the pressure controlled by the pressure controlling valve, and in the reverse direction by brake cylinder pressure; and a flow limiting valve in thrust relation with the second named abutment, and controlling the rate of flow from the triple valve to the brake cylinder, said flow limiting valve being of the poppet type, and arranged to open to permit exhaust flow from the brake cylinder regardless of the position of said second abutment.

12. The combination of a brake cylinder; a triple valve adapted to supply and exhaust air to and from said brake cylinder; and a pressure build-up delay mechanism interposed between said triple valve and brake cylinder and including an abutment shiftable in one direction by flow of air toward the brake cylinder and in the reverse direction by brake cylinder pressure; a loading spring reacting against said abutment in said reverse direction; a second spring also acting in said reverse direction and adapted to resist movement of said abutment beyond a chosen point; a pressure controlling valve actuated by said abutment; a second abutment urged in one direction by the pressure controlled by the pressure controlling valve, and in the reverse direction by brake cylinder pressure; and a flow limiting valve in thrust relation with the second named abutment, and controlling the rate of flow from the triple valve to the brake cylinder, said flow limiting valve being of the poppet type, and arranged to open to permit exhaust flow from the brake cylinder regardless of the position of said second abutment.

13. A delay mechanism for controlling the flow of air from a triple valve to a brake cylinder, comprising a delay valve capable of closing to limit but not suspend flow; a piston adapted to be shifted to abnormal position by the initial flow toward the brake cylinder and to be restored to normal position by the development of substantial brake cylinder pressure; a delay valve piston operatively connected with the delay valve and urged in a valve closing direction by brake cylinder pressure; a spring resisting such motion of the delay piston and serving to hold the delay valve open until brake cylinder pressure reaches a moderate value; and a valve actuated by the first named piston, serving in normal position thereof to admit pressure against the delay piston to hold it in delay valve opening position regardless of brake cylinder pressure, and serving in abnormal position to vent such holding pressure.

14. A delay mechanism for controlling the flow of air from a triple valve to a brake cylinder, comprising in combination a delay valve of the poppet type adapted to close in the direction of flow toward the brake cylinder to limit such flow, and to open in the direction of flow from the brake cylinder; a piston in the path of flow toward the brake cylinder in advance of said delay valve, and adapted to be shifted in one direction by absorbing energy from the flowing air, and in the opposite direction by brake cylinder pressure acting reversely upon it; a delay valve piston in thrust relation with said delay valve in a valve-opening direction, said delay piston being urged by brake cylinder pressure in a direction to permit the delay valve to close; yielding means urging said delay piston in a valve-opening direction; and valve means actuated by the first-named piston and serving to control pressure acting on the delay piston in a valve-opening direction.

15. The combination with a triple valve adapted to feed air to the brake cylinder connection, of a delay valve interposed in the path of flow from the triple valve to the brake cylinder connection and adapted when closed to restrict the flow to the brake cylinder connection; a piston subject on one side to the pressure of fluid flowing toward the delay valve and on the other side to pressure in the brake cylinder connection; a spring acting on said piston in the direction of the last named pressure; a supply and exhaust valve operated by said piston; a delay piston connected to actuate said delay valve and subject on one side to pressure in the brake cylinder connection and on the other to pressure established by said supply and exhaust valve; and a spring acting on said delay piston in the direction of the last named pressure.

16. The combination with a triple valve adapted to feed air to the brake cylinder connection at a restricted rate for service applications, and at a more rapid rate for emergency applications, of a delay valve interposed in the path of flow from the triple valve to the brake cylinder connection and adapted when closed to restrict the flow to the brake cylinder connection; a piston subject on one side to the pressure of fluid flowing toward the delay valve and on the other side to pressure in the brake cylinder connection; a spring acting on said piston in the direction of the last named pressure, said spring having strength sufficient to resist the downward tendency of said piston during service application flow; a supply and exhaust valve operated by said piston; a delay piston connected to actuate said delay valve and subject on one side to pressure in the brake cylinder connection and on the other to pressure established by said supply and exhaust valve; and a spring acting on said delay piston in the direction of the last named pressure.

17. The combination with a triple valve adapted to feed air to the brake cylinder connection at a restricted rate for service applications, and at a more rapid rate for emergency applications, of a delay valve interposed in the path of flow from the triple valve to the brake cylinder, said valve being of the poppet type closing in the direction of flow toward the brake cylinder and being normally open and operating when closed to throttle flow to the brake cylinder; a piston subject on one side to the pressure of fluid flowing toward the delay valve, and subject on the other side to pressure in the brake cylinder connection; a spring acting on said piston in the direction of the last named pressure to urge the piston to its normal position, said spring being adequate to sustain the piston against service flow but not against emergency flow; an admission and exhaust valve operated by said piston and arranged to supply fluid under pressure when the valve is in its normal position and to vent such pressure fluid when said spring is overpowered; a delay piston connected to actuate said delay valve, subject, in a delay-valve closing direction to pressure in the brake cylinder connection, and in delay-valve opening direction to pressure controlled by said admission and exhaust valve; and a spring urging said piston in a delay valve opening direction.

18. A structure as defined in claim 15 in which the amount of throttling produced by the closing of the delay valve is determined by the size of an interchangeable choke port member, acting as a by-pass from one to the other side of the valve.

19. A structure as defined in claim 15 in which the delay piston is mounted in a cylinder having an inwardly projecting flange which masks a portion of the piston from brake cylinder pressure when the piston is in delay-valve opening position, whereby initial motion of the piston in a valve closing direction increases its effective area and insures rapid full stroke motion.

20. A structure as defined in claim 15 in which the first named piston seats on a gasket in its abnormal position, and the delay piston seats on a gasket in each of its limiting positions.

21. The combination with a triple valve adapted to feed air to the brake cylinder connection, of a delay valve interposed in the path of flow from the triple valve to the brake cylinder connection and adapted when closed to restrict the flow to the brake cylinder connection; a piston subject on one side to the pressure of fluid flowing toward the delay valve and on the other side to pressure in the brake cylinder connection; a spring acting on said piston in the direction of the last named pressure; a second spring arranged to resist the motion of said piston beyond a definite point; a supply and exhaust valve operated by said piston; a delay piston connected to actuate said delay valve and subject on one side to pressure in the brake cylinder connection and on the other to pressure established by said supply and exhaust valve; and a spring acting on said delay piston in the direction of the last named pressure.

22. The combination with a triple valve adapted to feed air to a brake cylinder, of a delay valve mechanism interposed in the path of flow from the triple valve to the brake cylinder, said mechanism including a piston subject on one side to the pressure of fluid flowing to the brake cylinder, and on the other side to brake cylinder pressure; a shifting seat having a lost motion connection with said piston; a slide valve on said seat and shiftable relatively thereto by said piston; a spring reacting against said piston; a delay valve controlling flow from the triple valve to the brake cylinder and capable of opening automatically to permit reverse flow; and a delay piston arranged to actuate said delay valve, and subject on one side to brake cylinder pressure, and on the other side to pressure controlled by said slide valve in its movements relatively to said shifting seat.

23. The combination with a triple valve adapted to feed air to a brake cylinder, of a delay valve mechanism interposed in the path of flow from the triple valve to the brake cylinder, said mechanism including a piston subject on one side to the pressure of fluid flowing to the brake cylinder, and on the other side to brake cylinder pressure; a shifting seat having a lost motion connection with said piston; a slide valve on said seat and shiftable relatively thereto by said piston; a spring reacting against said piston; a delay valve controlling flow from the triple valve to the brake cylinder; and a delay piston arranged to actuate said delay valve, and subject on one side to brake cylinder pressure, and on the other side to pressure controlled by said slide valve in its movements relatively to said shifting seat.

24. The combination with a triple valve adapted to feed air to a brake cylinder, of a delay valve mechanism interposed in the path of flow from the triple valve to the brake cylinder, said mechanism including a piston subject on one side to the pressure of fluid flowing to the brake cylinder, and on the other side to brake cylinder pressure; a shifting seat having a lost motion connection with said piston; a slide valve on said seat and shiftable relatively thereto by said piston; a spring reacting against said piston and arranged to exert a resistance which increases disproportionately fast relatively to the spring deflection; a delay valve controlling flow from the triple valve to the brake cylinder; and a delay piston arranged to actuate said delay valve, and subject on one side to brake cylinder pressure, and on the other side to pressure controlled by said slide valve in its movements relatively to said shifting seat.

25. The combination with a triple valve adapted to feed air to a brake cylinder, of a delay valve mechanism interposed in the path of flow from the triple valve to the brake cylinder, said mechanism including a piston subject on one side to the pressure of fluid flowing to the brake cylinder, and on the other side to brake cylinder pressure; a shifting seat having a lost motion connection with said piston; a slide valve on said seat and shiftable relatively thereto by said piston; a spring reacting against said piston; a second spring arranged to resist motion of said piston beyond the point at which the slide valve has changed its functional relation with said shifting seat; a delay valve controlling flow from the triple valve to the brake cylinder; and a delay piston arranged to actuate said delay valve, and subject on one side to brake cylinder pressure, and on the other side to pressure controlled by said slide valve in its movements relatively to said shifting seat.

26. A triple valve, comprising in combination, a casing; a triple piston; a slide valve of the type having a normal recharge position and a restricted recharge position, to which last position the parts move upon high releasing brake pipe pressures, the slide valve being provided with a port which controls charging flow; connections for an auxiliary reservoir and a supplemental reservoir; a port serving to connect said reservoir connections, said port being opened by said slide valve in normal recharge and closed thereby in restricted recharge position; and a vent leading from said supplementary reservoir connections, controlled by said slide valve, and arranged to be opened thereby in restricted recharge position.

27. A triple valve, comprising in combination, a casing; a triple piston; a slide valve of the type having a normal recharge position and a restricted recharge position, to which last position the parts move upon high releasing brake pipe pressures, the slide valve being provided with a port which controls charging flow; a check valve closing against back flow through said port; connections for an auxiliary reservoir and a supplemental reservoir; a port serving to connect said reservoir connections, said port being opened by said slide valve in normal recharge and closed thereby in restricted recharge position; and a vent leading from said supplemental reservoir connections, controlled by said slide valve, and arranged to be opened thereby in restricted recharge position.

28. In a pneumatic brake system, the combination of a brake pipe; an auxiliary reservoir; an additional reservoir; a triple piston subject on one side to brake pipe pressure and on the other side to auxiliary reservoir pressure; a triple slide valve actuated by said piston; and a yielding retard stop tending to arrest said piston and valve in normal recharge position, and when overpowered permitting said parts to move to restricted recharge position, said slide valve controlling ports which permit a free charging flow from the brake pipe to both reservoirs in normal recharge position and in restricted recharge position permit restricted flow to the auxiliary reservoir, isolate the additional reservoir and permit venting flow therefrom.

29. In a pneumatic brake system, the combination of a brake pipe; an auxiliary reservoir; an additional reservoir; a triple piston subject on one side to brake pipe pressure and on the other side to auxiliary reservoir pressure; a triple slide valve actuated by said piston; a yielding retard stop tending to arrest said piston and valve in normal recharge position, and when overpowered permitting said parts to move to restricted recharge position, said slide valve controlling ports which permit a free charging flow from the brake pipe to both reservoirs in normal recharge position and in restricted recharge position permit restricted flow to the auxiliary reservoir, isolate the additional reservoir and permit venting flow therefrom; and a check valve adapted to prevent back flow from either reservoir to the brake pipe through the charging port.

30. In a pneumatic brake system, the combination of a brake pipe; an auxiliary reservoir; an additional reservoir; a triple valve chamber in constant communication with the auxiliary reservoir and having a valve seat provided with a feed port leading from the brake pipe, and a second feed port leading to said additional reservoir; a cylinder; a triple piston in said cylinder subject to opposing brake pipe and auxiliary reservoir pressures; a yielding retard stop tending to arrest said piston in normal recharge position, and when overpowered permitting it to move to restricted recharge position; and a triple slide valve on said seat, actuated by said piston and arranged to open both said feed ports in normal recharge position, and in restricted recharge position to restrict the first port and close the second.

31. The combination of a valve as defined in claim 30, of venting means for said second reservoir controlled by said triple valve and opened thereby in restricted recharge position.

32. The combination with a valve as defined in claim 30, of a check valve preventing flow through the first-named feed port toward the brake pipe.

33. In a pneumatic brake system, the combination of a brake pipe; an auxiliary reservoir; an additional reservoir; a triple piston subject on one side to brake pipe pressure and on the other side to auxiliary reservoir pressure; a triple slide valve actuated by said piston; and a yielding retard stop tending to arrest said piston and valve in normal recharge position, and when overpowered permitting said parts to move to restricted recharge position, said slide valve controlling ports which connect said reservoirs and permit a free charging flow from the brake pipe to both reservoirs in normal recharge position and in restricted recharge position permit restricted flow to the auxiliary reservoir, isolate the additional reservoir and permit venting flow therefrom, said ports being so arranged that as the triple valve moves from normal release toward quick service position, the charging port is closed before the reservoir-connecting port is closed.

34. A device for controlling the rate of development of pressure in brake cylinders, comprising in combination, an abutment subject in one direction to the pressure of air flowing toward the brake cylinder, and in the opposite direction to pressure in the brake cylinder; a normally open valve controlling flow to the brake cylinder and serving when closed to restrict said flow; motor means subject to brake cylinder pressure, for causing said valve to close; and means actuated by said abutment for rendering said motor means operative and inoperative.

35. A device for controlling the rate of development of pressure in brake cylinders, comprising in combination, an abutment subject in one direction to the pressure of air flowing toward the brake cylinder, and in the opposite direction to pressure in the brake cylinder; a normally open valve of the poppet type closing in the direction of flow toward the brake cylinder, and serving when closed to restrict said flow; pressure motor means in thrust relation with said valve in a valve opening direction, said pressure motor means being subject to brake cylinder pressure acting in the reverse direction; and means controlled by said abutment, for forcing said motor means in valve opening position when the abutment is in one position, and permitting it to respond to brake cylinder pressure when the abutment is in another position.

36. A device for controlling the rate of development of pressure in brake cylinders, comprising in combination, an abutment subject in one direction to the pressure of air flowing toward the brake cylinder, and in the opposite direction to pressure in the brake cylinder; a normally open valve of the check type closing in the direction of flow toward the brake cylinder, and serving, when closed, to restrict said flow; a fluid pressure motor in thrust relation with said valve in a valve opening direction, said motor being subject to brake cylinder pressure acting in the reverse direction; and valve means actuated by reverse motions of said abutment, and serving to admit or exhaust pressure fluid to and from said motor in opposition to brake cylinder pressure.

37. In a triple valve, the combination of a triple piston; a slide valve and a graduating valve actuated thereby, and having a normal release and recharge position, a restricted release and recharge position, a quick service position, a full service position and an emergency position; a graduating stem engaged by said piston in both service positions and the emergency position; a graduating spring reacting against said stem at all times; a second graduating spring having a lost motion connection with said stem, and adapted to resist further motion thereof after the first spring has been overpowered by partial motion of the stem; a yielding retard stop tending to arrest the triple piston when the valves are in normal release position and overpowered to permit the valves to move to restricted release and recharge position; an auxiliary reservoir; and a supplemental reservoir, the slide valve of the triple valve being ported to connect said reservoirs in normal release position, and to disconnect them in restricted release position, and vent the supplemental reservoir at a restricted rate.

38. The combination of a brake cylinder; a triple valve adapted to supply and exhaust air to and from said brake cylinder; an abutment adapted to be shifted from normal to an abnormal position by rapid air flow from the triple valve toward the brake cylinder; yielding means urging said abutment toward its normal position; a second abutment subject in one direction to brake cylinder pressure; a valve mechanism actuated by the first abutment and controlling the pressure acting on the second abutment in a direction opposite to the action of the brake cylinder pressure; and a valve actuated by said second abutment and controlling flow from said triple valve to said brake cylinder.

39. The combination of claim 38, further characterized in that the last-named valve is of the poppet type and is in thrust engagement with said second abutment.

40. The combination of claim 38, further characterized in that the yielding means resisting motion of the first abutment is so contrived as to develop a rapidly increasing resistance as the abutment moves from its normal to its abnormal position.

41. The combination of a brake cylinder; a triple valve adapted to supply and exhaust air to and from said brake cylinder; and a pressure build-up delay mechanism, comprising a valve controlling the rate of flow from the triple valve to the brake cylinder, and two abutments, one of which is operatively related to said valve to actuate the same, and is subject in one direction to brake cylinder pressure, and the other of which abutments is subject to a pressure differential created by flow from the triple valve toward the brake cylinder and operates to control a pressure acting on the second abutment in opposition to brake cylinder pressure.

42. The combination of a brake pipe, triple valve structure, auxiliary reservoir and supplemental reservoir, said triple valve structure including a piston-actuated slide valve and graduating valve and having a charging passage open in release position through which the auxiliary reservoir is charged from the brake pipe, said slide valve having a port controlled by said graduating valve, which port in release position connects said reservoirs, the parts being so proportioned that as they move from release position toward service position said charging passage is closed and thereafter said connecting port is closed.

CHARLES A. CAMPBELL.